(12) United States Patent
Young et al.

(10) Patent No.: US 11,839,805 B2
(45) Date of Patent: Dec. 12, 2023

(54) COMPUTER VISION AND ARTIFICIAL INTELLIGENCE APPLICATIONS IN BASKETBALL

(71) Applicant: BALLOGY, INC., Austin, TX (US)

(72) Inventors: Todd Young, Austin, TX (US); Syed Saad Hussain, Lahore (PK)

(73) Assignee: Ballogy, Inc., Austin, TX (US)

( * ) Notice: Subject to any disclaimer, the term of this patent is extended or adjusted under 35 U.S.C. 154(b) by 0 days.

(21) Appl. No.: 16/588,158

(22) Filed: Sep. 30, 2019

(65) Prior Publication Data

US 2020/0023262 A1 Jan. 23, 2020

Related U.S. Application Data

(63) Continuation-in-part of application No. 16/159,436, filed on Oct. 12, 2018.

(60) Provisional application No. 62/757,058, filed on Nov. 7, 2018, provisional application No. 62/571,724, filed on Oct. 12, 2017, provisional application No. 62/729,232, filed on Sep. 10, 2018.

(51) Int. Cl.
| | |
|---|---|
| *G06T 7/90* | (2017.01) |
| *A63B 71/06* | (2006.01) |
| *G06N 3/08* | (2023.01) |
| *G06T 7/73* | (2017.01) |
| *G06N 3/044* | (2023.01) |

(52) U.S. Cl.
CPC ......... *A63B 71/0605* (2013.01); *G06N 3/044* (2023.01); *G06N 3/08* (2013.01); *G06T 7/74* (2017.01); *G06T 7/90* (2017.01); *A63B 71/0622* (2013.01); *A63B 2071/0694* (2013.01); *A63B 2220/806* (2013.01); *A63B 2243/0037* (2013.01); *G06T 2207/10024* (2013.01)

(58) Field of Classification Search
CPC . G06T 7/74; G06T 7/90; G06N 3/044; G06N 3/08
USPC .......................................................... 709/217
See application file for complete search history.

(56) References Cited

U.S. PATENT DOCUMENTS

| | | | |
|---|---|---|---|
| 7,092,846 B2 | 8/2006 | Vock et al. | |
| 9,381,420 B2 | 7/2016 | Burroughs | |
| 2008/0015061 A1 | 1/2008 | Klein | |
| 2008/0312010 A1* | 12/2008 | Marty | A63B 24/0021 73/865.4 |
| 2009/0048044 A1 | 2/2009 | Oleson et al. | |
| 2009/0099924 A1 | 4/2009 | Lensch et al. | |
| 2013/0095959 A1* | 4/2013 | Marty | A63B 24/0021 473/448 |
| 2013/0286004 A1* | 10/2013 | McCulloch | G06T 19/006 345/419 |
| 2014/0222177 A1 | 8/2014 | Thurman et al. | |
| 2014/0301598 A1* | 10/2014 | Marty | G06T 7/80 382/103 |
| 2015/0170530 A1 | 6/2015 | Damman et al. | |
| 2015/0324751 A1 | 11/2015 | Orenstein et al. | |
| 2015/0332450 A1 | 11/2015 | Marty et al. | |

(Continued)

OTHER PUBLICATIONS

International Search Report and Written Opinion in International Application No. PCT/US2018/055712 dated Jan. 8, 2019, 11 pages.

*Primary Examiner* — Sibte H Bukhari
(74) *Attorney, Agent, or Firm* — Berkeley Law & Technology Group, LLP

(57) ABSTRACT

Various applications of computer vision and artificial intelligence to basketball practice and game situations are described.

16 Claims, 16 Drawing Sheets

(56) References Cited

U.S. PATENT DOCUMENTS

| | | |
|---|---|---|
| 2016/0027325 A1 | 1/2016 | Malhotra |
| 2016/0096067 A1* | 4/2016 | Lanni ................ A63B 69/0071 473/447 |
| 2017/0095716 A1 | 4/2017 | Lewis et al. |
| 2018/0075392 A1 | 3/2018 | Surane |
| 2019/0111317 A1 | 4/2019 | Young et al. |
| 2019/0385477 A1 | 12/2019 | Young et al. |

* cited by examiner

Reference Frame
(may be color filtered to isolate pixels the color of the basketball hoop and/or net)

COMPUTER VISION AND ARTIFICIAL INTELLIGENCE APPLICATIONS IN BASKETBALL

CROSS-REFERENCE TO RELATED APPLICATIONS

The present application claims priority from U.S. Provisional Patent Application No. 62/757,058 entitled "COMPUTER VISION AND ARTIFICIAL INTELLIGENCE APPLICATIONS IN BASKETBALL," filed Nov. 7, 2018, the contents of which are incorporated by reference in their entirety.

The present application also claims priority from and is a continuation-in-part of U.S. Non-Provisional patent application Ser. No. 16/159,436 entitled "SYSTEM AND METHOD OF BASKETBALL TESTING," filed Oct. 12, 2018, which claims priority from U.S. Provisional Patent Application No. 62/571,724 entitled "DISTRIBUTED NETWORKED COMPUTER PLATFORM FOR ATHLETICS," filed Oct. 12, 2017, and which claims priority from U.S. Provisional Patent Application No. 62/729,232 entitled "SYSTEM AND METHOD FOR SPORTS SOCIAL MEDIA APPLICATION," filed Sep. 10, 2018, the entire contents of each of which are incorporated herein by reference in their entirety.

BACKGROUND

Although use of computer vision and artificial intelligence (AI) is becoming more common, one area that they are still in their relative infancy is in sports. For decades, the only "AI"-type logic in sports was computer-controlled opponent behavior in sports video games (and this wasn't actually AI, but rather explicit programming designed to mimic intelligence). Uses of computer vision in sports has largely been directed to television viewing enhancements. Examples include first down and line-of-scrimmage indicator lines during football games, golf ball "tails" to track the flight of a golf ball, and a "glow shadow" being applied to a hockey puck.

Coaching and recruiting have been late to advance from paper to digital. Coaches often distribute hardcopies of drills and plays, take paper notes, score drills on paper sheets, etc. Coaches and recruiters often use multiple third party systems for compiling data, translating documents into digital form, contacting players, scoring players, predicting performance, etc. Often, these third party systems are not compatible with each other. As such, a disproportionate amount of time and effort involved in coaching and recruiting involves administrative tasks rather than substantive coaching and recruiting.

DETAILED DESCRIPTION

The disclosed embodiments provide systems and methods for operating a sports social media application. The system includes a server and multiple client devices running the sports social media application. The sports social media application provides a centralized communication platform for players, parents and coaches. Coaches can share camp schedules team, schedules, leaderboards, photo and video highlights, and other relevant information directly with participants. Players and parents can also collaborate and engage with coaches and each other.

The sports social media application includes a built-in testing program which enables coaches to create and send tests, and enables players to measure and evaluate their athletic performance and to improve their skills at every level of the game. The sports social media application includes an analytics program to measure, track, evaluate, and predict the growth and progress of a player's development over time. Additionally, coaches and recruiters can measure, track, evaluate, and predict the growth and progress the player's development over time to make more informed coaching and recruiting decisions.

The sports social media application also provides a forum for individual players to connect, compete, network, and share with coaches, recruiters, schools and teammates, via a dedicated application, giving users increased visibility and access as compared to traditional recruiting process, which involves sending video files to coaches and recruiters.

Biometric hardware, RFID, and greatly enhanced video capability generate large amounts of performance data for elite athletes and the college and professional programs that depend on them. However, there is no industry standard or corresponding platform for professional and amateur organizations to monitor recruiting candidates or young athletes to effectively measure, track, and benchmark their growth and progress as they grow up and work hard to get better. The disclosed sports social media application enables the integration, use, and protection of the performance data. Additionally, amateur and young athletes can engage in a sports centric social network to share their skills, progress, and passion outside traditional social media and social network applications.

Figure 1:
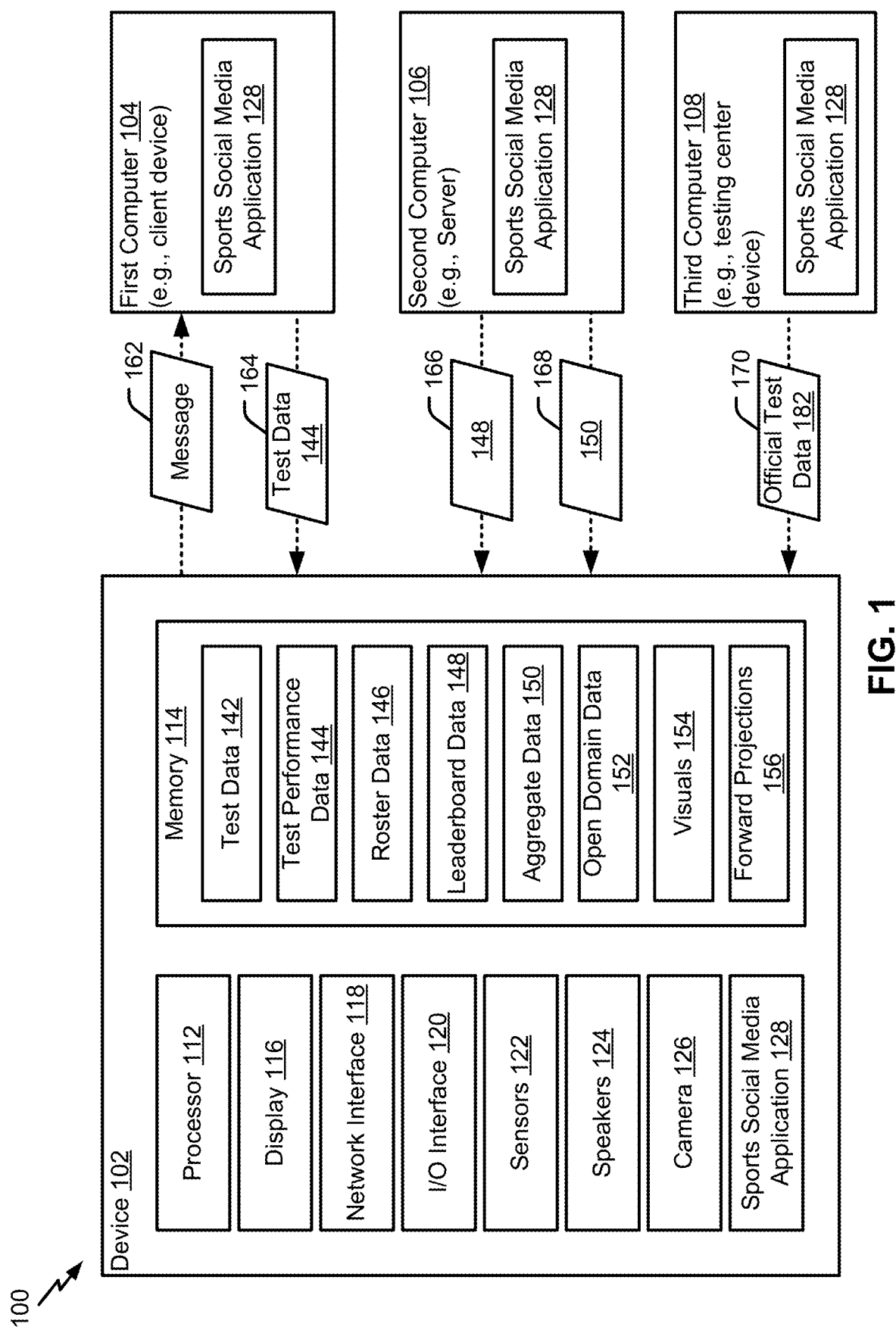
FIG. 1 is a block diagram that illustrates an example a system for a sports social media application.

FIG. 1 illustrates a block diagram of an example of a system 100 for a sports social media application 128. The system 100 includes a device 102, a first computer 104, a second computer 106, and a third computer 108. The device 102 may include or correspond to mobile device, a laptop computer, or a desktop computer. As illustrated in the example of FIG. 1, the device 102 corresponds to a client device (e.g., a smartphone) of the sports social media application 128 for a coach user.

The device 102 includes a processor 112, a memory 114, a display 116, a network interface 118, an input/output (I/O) interface 120, sensors 122, speakers 124, a camera 126, and the sports social media application 128. The processor 112 is coupled to the memory 114 and is configured to execute instructions stored in the memory 114. In a particular aspect, the sports social media application 128 is stored in the memory 114 and is executable by the processor 112.

The display 116 is configured to output a graphical user interface (GUI) responsive to signals generated by the processor 112 and/or a graphics processing unit (GPU) thereof (not shown). In some implementations, such as when the device 102 is a smartphone, the display 116 includes a touchscreen display. The network interface 118 includes or corresponds to a wired networking interface, a wireless networking interface, or a combination thereof, and is configured to communicate with other devices, such as the first computer 104, the second computer 106, the third computer 108, or a combination thereof, via a network.

The sensors 122 are configured to generate sensor data, which is used by the device 102 and the sports social media application 128 to generate and update the GUI. The sensors 122 include one or more of an inertial measurement unit (IMU), a microphone, or a combination thereof. The IMU includes one or more gyroscopes, accelerometers, magnetometers, or a combination thereof, and is configured to generate sensor data that indicates user movement, such as speed, acceleration, force, etc.

The microphone is configured to receive user audio inputs (e.g., voice commands) and is configured to generate sensor data indicative of the audio inputs. The microphone sensor data can enable the device 102 and the sports social media application 128 to generate and update the GUI responsive to user voice commands. In some implementations, the microphone corresponds to a microphone array.

The speakers 124 are configured to output audio indications (e.g., instructions or notifications) and content to the user. Accordingly, the user can hear instructions and notifications while focusing on taking a test.

The camera 126 is configured to capture video and generate video data. In some implementations, the video data can enable the sports social media application 128 to process the video data to determine test results (e.g., test performance data), certify test results, or both. For example, the sports social media application 128 uses machine vision to determine if a player makes a basket, hits a pitch, throws a strike, etc.

The sports social media application 128 is configured to generate and update a GUI displayed by the display 116. Additionally, the sports social media application 128 is configured to generate messages, create tests, send tests, monitor tests, track performance, and predict performance, as further described herein.

The first computer 104, the second computer 106, and the third computer 108 each include the sports social media application 128 or modules thereof. Additionally, each of the first computer 104, the second computer 106, and the third computer 108 may include one or more of the components of the device 102.

As illustrated in the example of FIG. 1, the first computer 104 corresponds to a client device of the sports social media application 128. For example, the first computer 104 can be a smartphone, laptop, or desktop computer associated with a player user.

The first computer 104 is configured to receive messages via the sport social media application 128, such as a message 162 from the device 102. The messages include practice updates, playbook updates, sports highlights, sports news, or a combination thereof. Additionally, the messages can include test data 142 and can be configured to assign tests to one or more player users. To illustrate, the test data 142 can be assigned to multiple player users of a particular roster indicated by roster data 146. The roster data 146 enables coaches to create and edit team rosters, camp rosters, recruiting rosters, or a combination thereof, to manage multiple players, camps, and/or teams.

As illustrated in the example of FIG. 1, the second computer 106 corresponds to a server of the sports social media application 128. For example, the second computer 106 can be central server that facilitates communications (e.g., messages) of the sports social media application 128, provides data (e.g., leaderboard data 148, aggregate data 150, open domain data 152, etc.) to client devices, or a combination thereof. Although a server is described, it is to be understood that in some implementations server-side operations may be performed by cloud computer(s), virtual machine(s), etc.

The second computer 106 is configured to route communications of the sports social media application 128 for client devices. For example, the second computer 106 may receive a particular message from the device 102 and forward the particular message to the first computer 104. The second computer 106 is further configured to receive test performance data 144 from the client devices. The second computer 106 generates leaderboard data 148 and aggregate data 150 based on test performance data 144 corresponding to multiple player users. The second computer 106 is configured to send the leaderboard data 148 and the aggregate data 150 to the client devices. In some implementations, the second computer 106 sends a portion of the aggregate data 150 (e.g., aggregate data 150 corresponding to public test results, such as test performance data 144 flagged as public). This enables client devices to generate more accurate forward projections 156, as further described herein, while ensuring privacy and that proprietary data (e.g., private test performance data 144) is not publicly shared.

Figure 2:
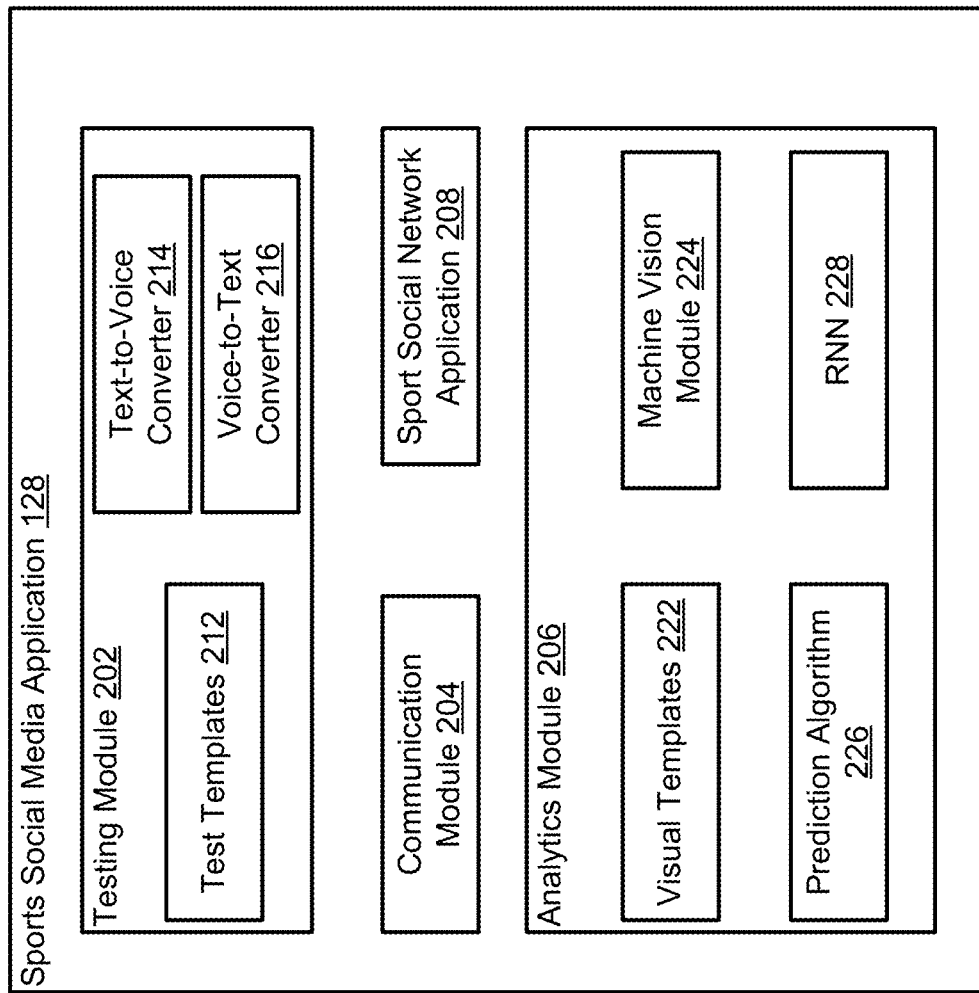
FIG. 2 is a block diagram that illustrates an example of a sports social media application.

In some implementations, the second computer 106 generates visuals 154 and forward projections 156 based on the aggregate data 150 or based on the aggregate data 150 and open domain data 152, as described further with reference to FIG. 2. The visuals 154 include or correspond to graphical representations of the test performance data 144, the forward projections 156, or both. As illustrative, non-limiting examples, the visuals 154 include a histogram, a scatter plot, a pie chart, or a bar graph. The forward projections 156 include or correspond to estimates of future test results (future or predicted test performance data 144) for a player user, estimates of future statistics and results for a team (e.g., team forward projections), or both. For example, the forward projections 156 include expected results. As illustrative, non-limiting examples, the forward projections 156 include estimated points, assists, goals, wins, losses, etc. The open domain data 152 corresponds to data that is outside of the sports social media application 128 and is available to the public. As illustrative, non-limiting examples, the open domain data 152 includes weather data, player statistics from outside sources, contract data, betting odds data, etc.

As illustrated in the example of FIG. 1, the third computer 108 corresponds to a client device of a testing center associated with the sports social media application 128. For example, the third computer 108 is a computer of an authorized or certified facility to administer tests identified by test data 142 and to generate official test performance data 182. The third computer 108 may receive the test data 142 directly from the device 102 or may indirectly receive the test data 142 from the device 102 via the first computer 104, the second computer 106, or both. For example, the device 102 may send the test data 142 to the first computer 104 directly or via the second computer 106, and the first computer 104 may send or upload the test data 142 to the third computer 108.

The third computer 108 is configured to send the official test performance data 182 to one or more devices or computers. For example, if the test data 142 indicates a public test, the official test performance data 182 is sent to the second computer 106. Alternatively, if the test data 142 indicates a private test, the official test performance data 182 is sent to the device 102 (assigning user), the first computer 104 (player user), or both.

During operation, the device 102 sends a message 162 to the first computer 104 using the sports social media application 128 responsive to user (e.g., coach user) input. For example, the network interface 118 sends the message 162, which includes test data 142 indicating a particular test for a player user associated with the first computer 104. The message 162 can be sent directly to the first computer 104, as illustrated in FIG. 1, or can be sent via the second computer 106. Operation of the sports social media application 128 and GUIs thereof to select a user and a test are described with reference to FIGS. 3-10.

Responsive to the first computer 104 receiving the message 162, the first computer 104 generates a notification indicating that a test corresponding to the test data 142 has been assigned to the player user associated with the first computer. The player user can use the sports social media application 128 to initiate and administer the test. For example, the sports social media application 128 of the first computer 104 generates GUIs, voice instructions, audio notifications, or a combination thereof, to administer the test. The sports social media application 128 of the first computer 104 receives user inputs indicating test results and generates test performance data 144 based on the user inputs. Additionally or alternatively, the sports social media application 128 of the first computer 104 captures video, sensor data, or both, and generates the test performance data 144 based on one or more of the user inputs, the video, or the sensor data. The first computer 104 sends the test performance data 144 to the device 102, the second computer 106, or both. The test performance data 144 may be validated (e.g., certified) by including the video in the test performance data 144 for verification of the test result indicated by the test performance data 144 or by including the video in a second message 164 to the device 102, the second computer 106, or both. The device 102, the second computer 106, or both, can validate the test performance data 144 based on the video. For example, a user associated with the device 102 may manually review the video and confirm the test results or a machine vision module can automatically review the video and confirm the test results.

In other implementations, the player user associated with the first computer 104 travels to a location of the third computer 108 to take an official test or to generate official test results (i.e., official test performance data 182). One or more users (e.g., testing officials) associated with the third computer 108 administer the test using the sports social media application 128 and one or more cameras thereof. The official test performance data 182 generated by the third computer 108 is sent to the device 102, the first computer 104, the second computer 106, or a combination thereof, using the sports social media application 128. As illustrated in the example of FIG. 1, the third computer 108 sends a third message 166, including the official test performance data 182, to the device 102. Similarly, in other implementations, the player user associated with the first computer 104 is near or travels to a location of the device 102, and the coach user associated with the device 102 administers the test using the device 102.

After receiving the test performance data 144 corresponding to the test data 142, the device 102 generates one or more visuals 154, one or more forward projections 156, or a combination thereof, based on the test performance data 144 (or the official test performance data 182). Additionally, the device 102 can request leaderboard data 148 from the second computer 106 to evaluate how the player user associated with the first computer 104 ranks compared to other users of the sports social media application 128. As illustrated in the example of FIG. 1, the second computer 106 sends a fourth message 168, including the leaderboard data 148, to the device 102. Further, the device 102 can request the aggregate data 150 from the second computer 106. As illustrated in the example of FIG. 1, the second computer 106 sends a fifth message 170, including the aggregate data 150, to the device 102. The aggregate data 150 enables the device 102 to generate more accurate forward projections 156. To illustrate, the aggregate data 150 from the second computer 106 has a larger sample size than the aggregate data 150 that is locally stored on the device 102.

FIG. 2 is a block diagram 200 of an example of the sports social media application 128 of FIG. 1. The sports social media application 128 includes a testing module 202, a communication module 204, an analytics module 206, and a sports social networking application 208.

The testing module 202 includes test templates 212, a text-to-voice converter 214, and a voice-to-text converter 216. The testing module 202 (e.g., a custom test builder module) is configured to administer tests, configure or customize tests, generate new tests, generate and manage a playbook, and generate test sets. For example, the testing module 202 generates the test data 142 of FIG. 1 based on test templates 212. The testing module 202 administers the test based on the test data 142. To illustrate, the text-to-voice converter 214 converts text of a test data 142 into audio commands to instruct a player user during the test. The testing module 202 generates test performance data 144 based on sensor data from the sensors 122 of FIG. 1, user inputs, video from the camera 126 of FIG. 1, or a combination thereof.

The testing module 202 has test builder and customization features that enable the testing module 202 to be applicable to a variety of different sports. For example, when employed in the field of basketball the sports social media application 128 outputs a graphical representation of a basketball court or portion thereof. A user can place markers and other graphical indicators along with annotations and/or audio instructions to create a custom test and enable a player user to carry out the test.

In some implementations, the testing module 202 can include one or more questions in the test data 142. For example, in the case of a Basketball shot test, did the player being tested make the shot or not? The testing module 202 generates buttons corresponding to answers or responses to the question, such as a make button and a miss button. In other implementations, the test data 142 may include non-binary questions that include free form or variable value answers. For example, in the domain of athletics, a user enters the time spent completing a specific course or distance.

The testing module 202 is further configured to generate a playbook or a test set. Further, the playbook or test set may be flagged as private or public. Thus, a coach user can keep such data private and only accessible to certain rosters, types or classes of players, or players that meet certain specific requirements.

The communication module 204 is configured to send and receive messages via the sports social media application 128 of FIG. 1, such as the sports social network application 208 thereof. For example, the communication module 204 is configured to access and initiate transmission of messages via the network interface 118 of the device 102. The messages includes chat messages (e.g., text messages) media messages (e.g., photo and/or video messages), and test assignment messages. As illustrative, non-limiting examples, the communication module 204 sends highlight video, instructional videos, sports news, etc., to devices associated with one or more users. The communication module 204 can send messages directly to other users (e.g., clients of the sports social networking application 208) or can send messages to other users via a central server, such as the second computer 106 of FIG. 1.

In a particular implementation, the communication module 204 receives or retrieves a test for a user when publication criteria of a particular test specified by another user (e.g., a coach who created the test) match the user. To illustrate, when the player user has met a certain performance criteria, is in the coaches' targeted groups, etc., the test data 142 corresponding to the particular test is received or retrieved by the communication module 204 and a notification or a feed entry is generated in the GUI.

The analytics module 206 includes visual templates 222, a machine vision module 224, a prediction algorithm 226, and one or more machine learning and/or artificial intelligence components. Examples of such component include, but are not limited to, Recurrent Neural Networks, such as an illustrative RNN 228. The visual templates 222 include data for creating the visuals 154 of FIG. 1. The machine vision module 224 is configured to generate validated or certified test performance data 144 based on video data corresponding to video captured by the camera 126 during the test. The prediction algorithm 226 is configured to generate the forward projections 156 of FIG. 1 based on the test performance data 144 and the aggregate data 150, such as by using the RNN 228. In some implementations, the RNN 228 is a RNN for continuous value prediction.

The analytics module 206 is configured to analyze test results (e.g., test performance data 144 or the official test performance data 182 of FIG. 1) and to represent the test results in graphical formats, such as by generating the visual 154 of FIG. 1. Additionally, the analytics module 206 is configured to employ statistical and machine learning techniques (for example, Holt Winters, ARMA/ARIMA, the RNN 228, etc.) to predict future test results for future tests based on the test results (test performance data 144) and the aggregate data 150 of FIG. 1. Such future test results can provide coaches with information and/or a graphical output that includes performance/test result curves abstracted from individual data.

Further, the analytics module 206 is configured to compare the test results of various users who have taken the same tests. For example, the analytics module 206 generates a histogram, a scatter plot, a pie chart, or another visualization that depicts test results from two or more users. As an illustrative, non-limiting example, a comparison of five players that have scored a certain number of points on a particular test can be contrasted on a pie chart indicating test results with respect to another test.

The analytics module 206 enables coaches to project likely performance of a user using predictive techniques (e.g., the predictive algorithm 226 and the RNN 228). The coach can use the estimated future performance to see the estimated progress and gauge or extrapolate where a certain player will be at some time in the future, such as by the end of a performance testing period, start of the season, playoffs, etc.

The sports social networking application 208 is configured to generate and update a GUI and to facilitate sending messages between users of the sports social networking application 208.

During operation, the testing module 202 generates a custom test responsive to user inputs. For example, a user selects a particular test template 212 of the testing module 202 and inputs audio data indicating test instruction to the sensors 122 of the device 102. Additionally or alternatively, the user may physical perform a portion of the test while holding or carrying the device 102, and the sensors 122 capture the user's movement and generate sensor data indicative of the user's movement (e.g., location, speed, timing, etc.). The testing module 202 generates test data 142 based on the sensor data, such as shot location information, passing route instruction information, etc.

The communication module 204 sends the test data 142 to a player user via the sports social network application 208, and the player user can take the test indicated by the test data 142. During administration of the test, the testing module 202 uses the text-to-voice converter 214 to generate audio commands to instruct the user and generates a GUI based on the test data 142. The testing module 202 generates the test performance data 144 based on user inputs and sensor data.

In some implementations, the machine vision module 224 processes video captured during the test to validate the test performance data 144. The analytics module 206 can modify the test performance data 144 to correct the test result indicated by the data or to certify or validate the test performance data 144.

The prediction algorithm 226 generates a forward projection 156 for the player user based on the test performance data 144 and the aggregate data 150, locally stored or received from the second computer 106 of FIG. 1. For example, the prediction algorithm 226 uses the RNN 228 to generate a forward projection 156 indicating an estimated future test result of the test taken, such as 40 yard dash time in four years. Additionally, the prediction algorithm 226 uses the RNN 228 to generate a second forward projection 156 indicating an estimated future test result of a different test, such as a three-point shooting drill score now and in two years. The analytics module 206 can further generate one or more visuals 154 illustrating the test performance data 144, a portion of the aggregate data 150, the forward projections 156, or a combination thereof, using the visual templates 222.

FIGS. 3-18 illustrate example GUIs output by the device 102 of FIG. 1. Operation of selecting and sending a test to a user is explained with reference to FIGS. 3-6. Additionally, operation of a roster evaluation is explained with reference to FIGS. 7 and 8. Another operation of a roster evaluation is explained with reference to FIGS. 9 and 10. Furthermore, operation of a leaderboard is explained with reference to FIG. 11.

Figure 3:
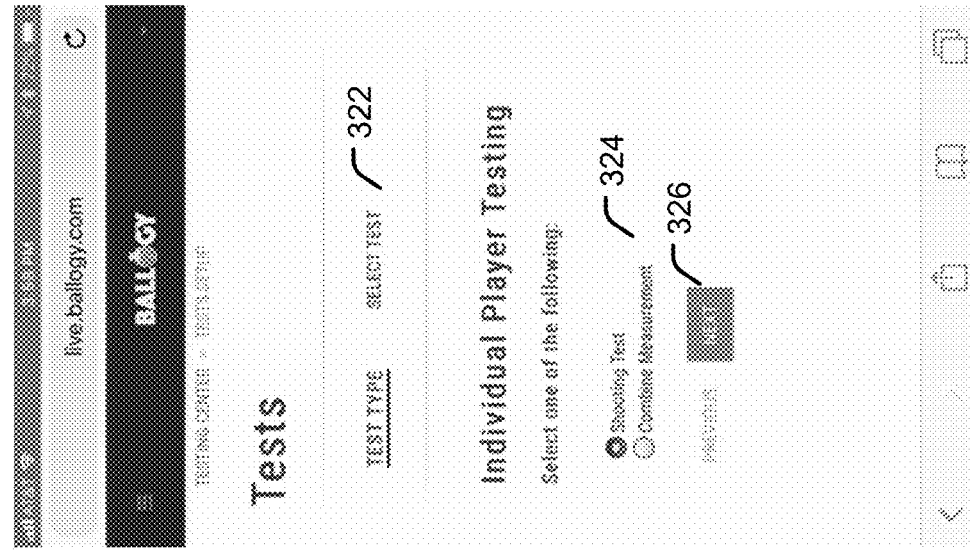
FIG. 3 is a diagram that illustrates examples of GUIs of a sports social media application.
Figure 3:
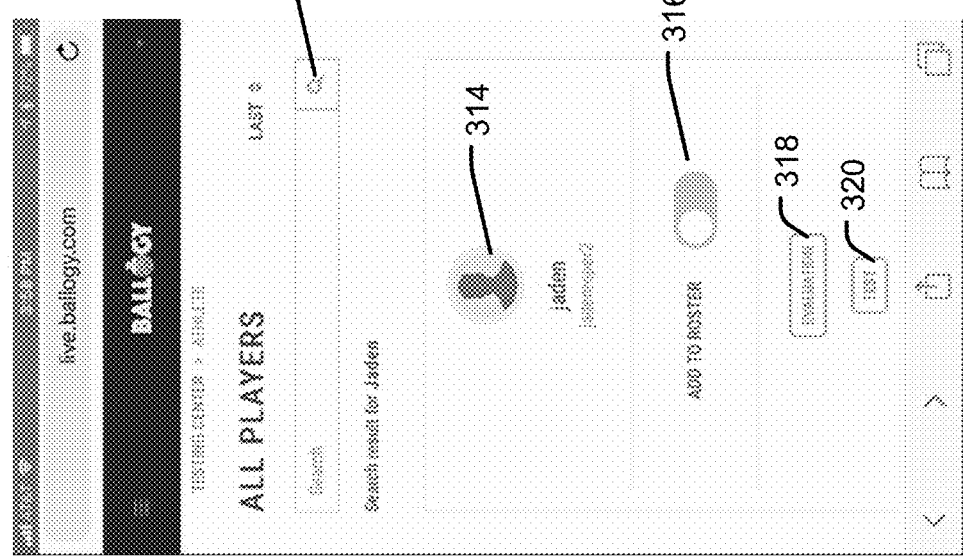

FIG. 3 illustrates examples of testing center GUIs of the sports social media application 128. As illustrated in the example of FIG. 3, a first testing center GUI 300 includes a search bar 312, user identification information 314, an add-to-roster button 316, an evaluation button 318, and a test button 320. The search bar 312, when accessed may display a keyboard, a set of filters, list of players to search, or a combination thereof to facilitate user searching and selection. As illustrated in the example of FIG. 3, the user identification information 314 includes a user photo or identification photo, a name, and a username. The add-to-roster button 316 adds the current or selected user (Jaden) to one or more rosters. When accessed, the add-to-roster button 316 may display a keyboard, a set of filters, list of rosters to search, or a combination thereof to facility roster searching and selection. The test and evaluation buttons 318 and 320, when accessed, may display GUIs to enable evaluating the current or selected user (Jaden) and sending a test to the current or selected user (Jaden), as described with reference to FIG. 4-6.

As illustrated in the example of FIG. 3, a second testing center GUI 302 includes a test bar 322, test selection buttons 324, and a next button 326. The test bar 322, when accessed may display a keyboard, a set of filters, list of players to search, or a combination thereof, to facilitate user searching and selection.

Figure 4:
FIG. 4 is a diagram that illustrates examples of GUIs of a sports social media application.

FIG. 4 illustrates examples of testing center GUIs of the sports social media application 128. Responsive to a user selecting one of the test selection buttons 324 and activating the next button 326, the device 102 outputs a third testing center GUI 400. As illustrated in the example of FIG. 4, the third testing center GUI 400 corresponds to a combine shooting (100) test and includes information about the combine shooting (100) test. In other implementations, the third testing center GUI 400 includes more than one test. As illustrated in the example of FIG. 4, the third testing center GUI 400 includes test name 412, test description 414, and test instructions 416.

A fourth testing center GUI 402 includes detailed information for the selected combine shooting (100) test. As illustrated in the example of FIG. 4, the fourth testing center GUI 402 includes test participants 422, test instructions 416 (e.g., test quantity and test duration), test level 424 (e.g., shooting distance), a select button 426, test action type 428, test action instructions 430. FIG. 4 further depicts a test level pop-up window 432 for selecting the test level 424. In other implementations, the fourth testing center GUI 402 includes more or less information than illustrated in FIG. 4.

Figure 5:
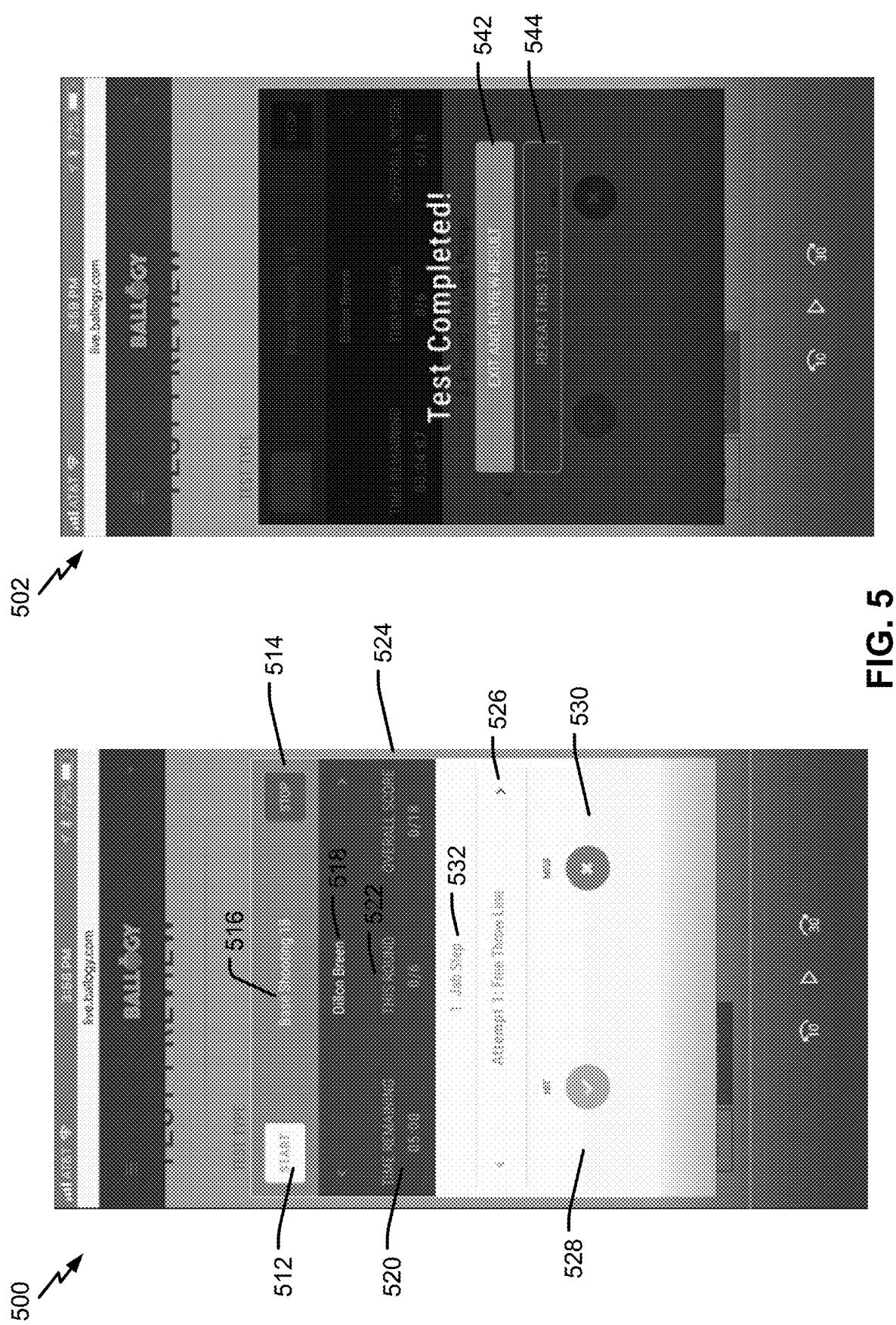
FIG. 5 is a diagram that illustrates examples of GUIs of a sports social media application.

FIG. 5 illustrates examples of testing center GUIs of the sports social media application 128. A fifth testing center GUI 500 includes information and buttons to administer the selected test. As illustrated in the example of FIG. 5, the fifth testing center GUI 500 includes a start button 512, a stop button 514, test title 516, player name 518, time remaining information 520, round score information 522, overall score information 524, attempt information 526, a make button 528, and a miss button 530. In some implementations, the fifth testing center GUI 500 includes instruction or type information 532. Responsive to a user selecting the start button 512, the device 102 updates the sixth testing center GUI 502 to begin the test. Additionally, the device 102 updated the sixth testing center GUI 502 responsive to user inputs via the make button 528 and the miss button 530, sensor data, video data, or a combination thereof. In other implementations, the fifth testing center GUI 500 includes more or less information than illustrated in FIG. 5, more or less buttons than illustrated in FIG. 5, other information or buttons than illustrated in FIG. 5, or a combination thereof.

Responsive to a user selecting the stop button 514, the device 102 outputs a sixth testing center GUI 502. The sixth testing center GUI 502 corresponds to a test completion GUI. As illustrated in the example of FIG. 5, the sixth testing center GUI 502 includes an exit and review button 542 and a repeat test button 544. In other implementations, the sixth testing center GUI 502 includes more or less information than illustrated in FIG. 5.

Figure 6:
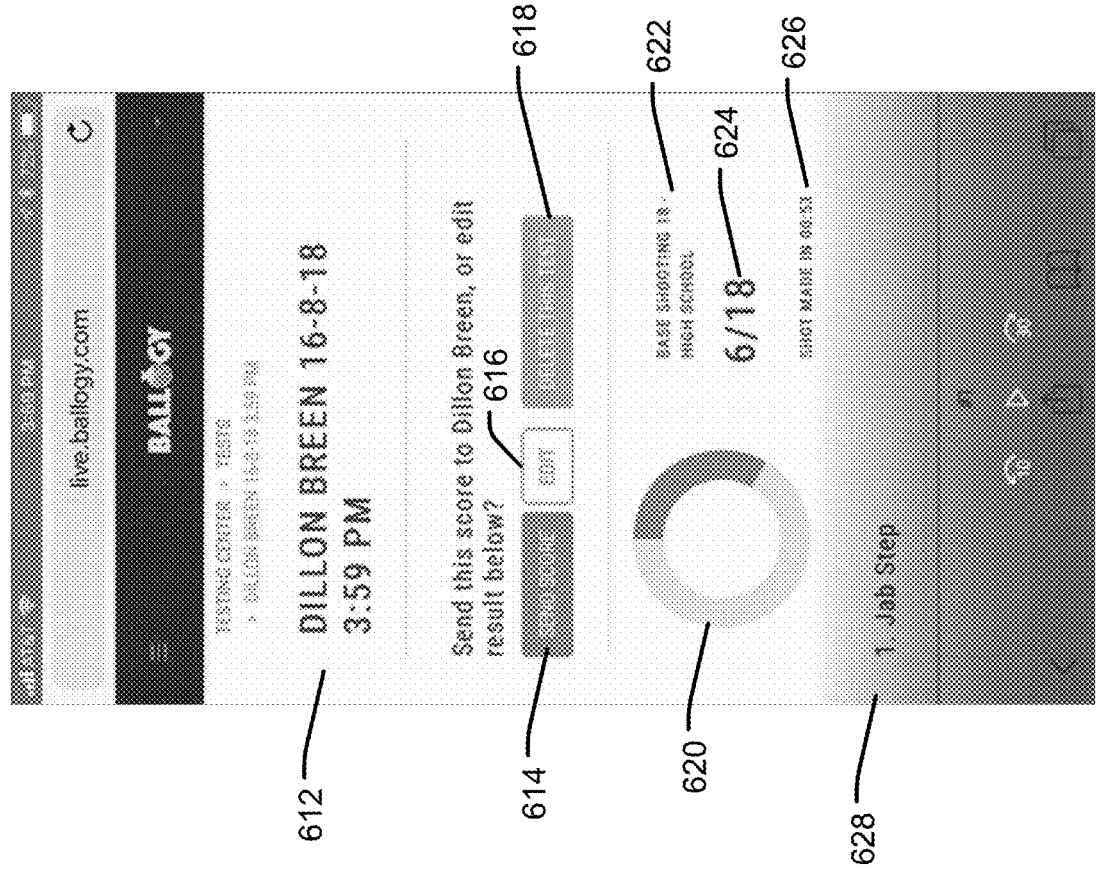
FIG. 6 is a diagram that illustrates another example of a testing center GUI of a sports social media application.

FIG. 6 illustrates an example of a seventh testing center GUI 600 of the sports social media application 128. Responsive to a user selecting the exit and review button 542 of FIG. 5, the device 102 outputs the seventh testing center GUI 600. The seventh testing center GUI 600 depicts test result information. As illustrated in the example of FIG. 6, the seventh testing center GUI 600 includes test identification information 612, a send score button 614, an edit test button 616, a delete test button 618, a test results graph 620, test information 622 (e.g., name and level), test result information 624, duration information 626, and test description information 628. In other implementations, the seventh testing center GUI 600 includes more or less information than illustrated in FIG. 6, more or fewer buttons than illustrated in FIG. 6, or a combination thereof.

Figure 7:
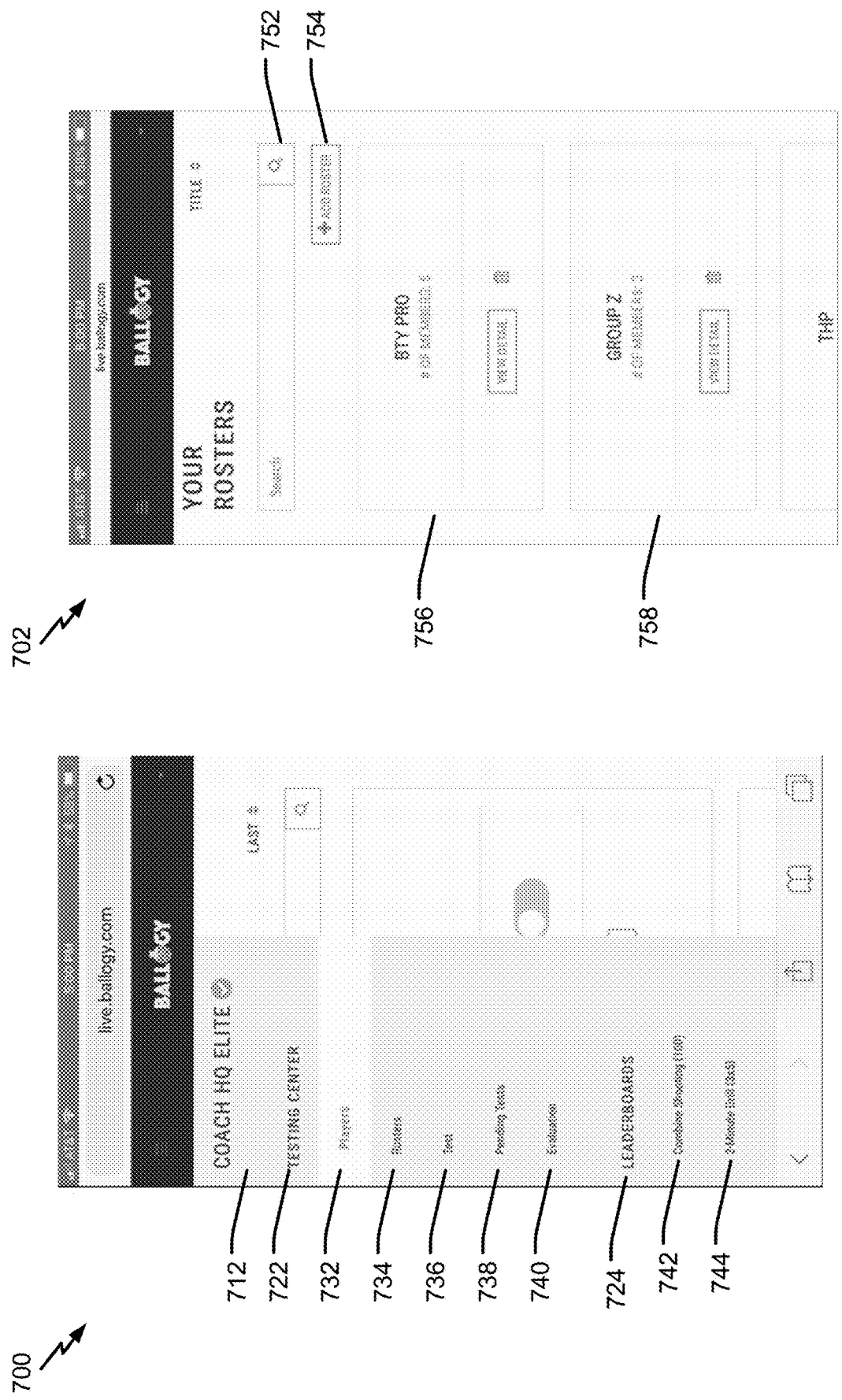
FIG. 7 is a diagram that illustrates examples of GUIs of a sports social media application.

FIG. 7 illustrates examples of testing center GUIs of the sports social media application 128. A first testing center GUI 700 depicts a navigation sidebar 712. As illustrated in the example of FIG. 7, the navigation sidebar 712 includes a link 722 to a testing center home and a link 724 to a leaderboards home. The navigation sidebar 712 may further include testing center and/or leaderboard subpage links. As illustrated in the example of FIG. 7, the navigation sidebar 712 includes testing center subpage links of a players link 732, a rosters link 734, a test link 736, a pending tests link 738, an evaluation link 740, and includes leaderboard subpage links of a combine shooting (100) leaderboard link 742 and a 2-minute drill (3×5) leaderboard link 744.

Responsive to a user activating the rosters link 734, the device 102 outputs a second testing center GUI 702. The second testing center GUI 702 depicts rosters of the user. As illustrated in the example of FIG. 7, the second testing center GUI 702 includes a roster search bar 752, an add roster button 754, a first roster 756, and a second roster 758. As illustrated in the example of FIG. 7, each roster 756, 758 includes name information, number of users or members, a view detail button, and remove roster button. Additionally, each roster may include additional information and buttons or fewer information and buttons than as illustrated in the example of FIG. 7.

Figure 8:
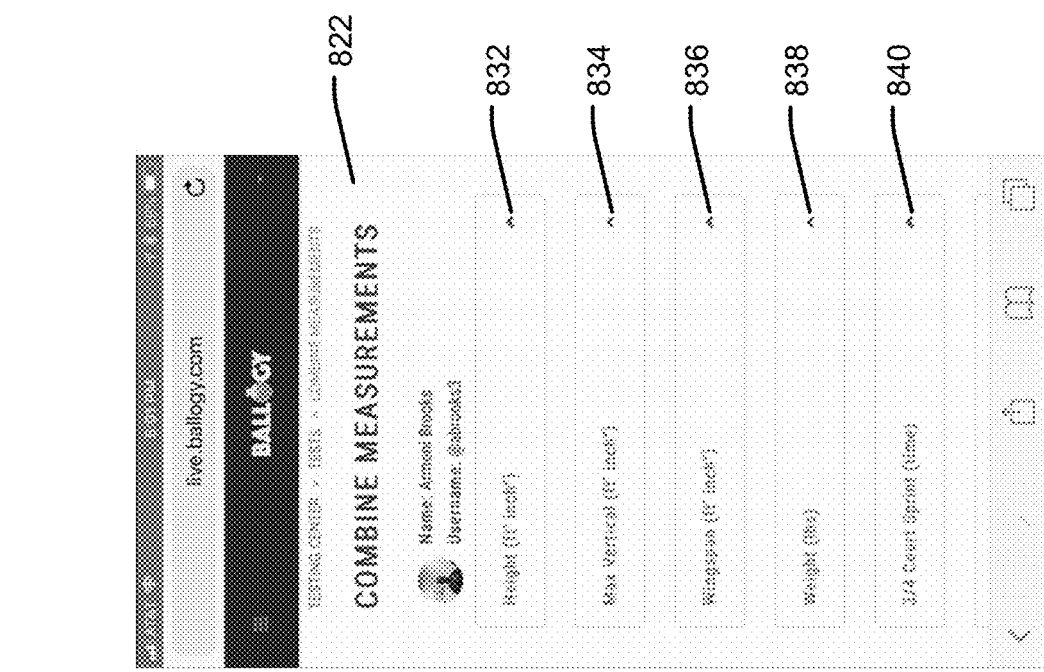
FIG. 8 is a diagram that illustrates examples of GUIs of a sports social media application.
Figure 8:
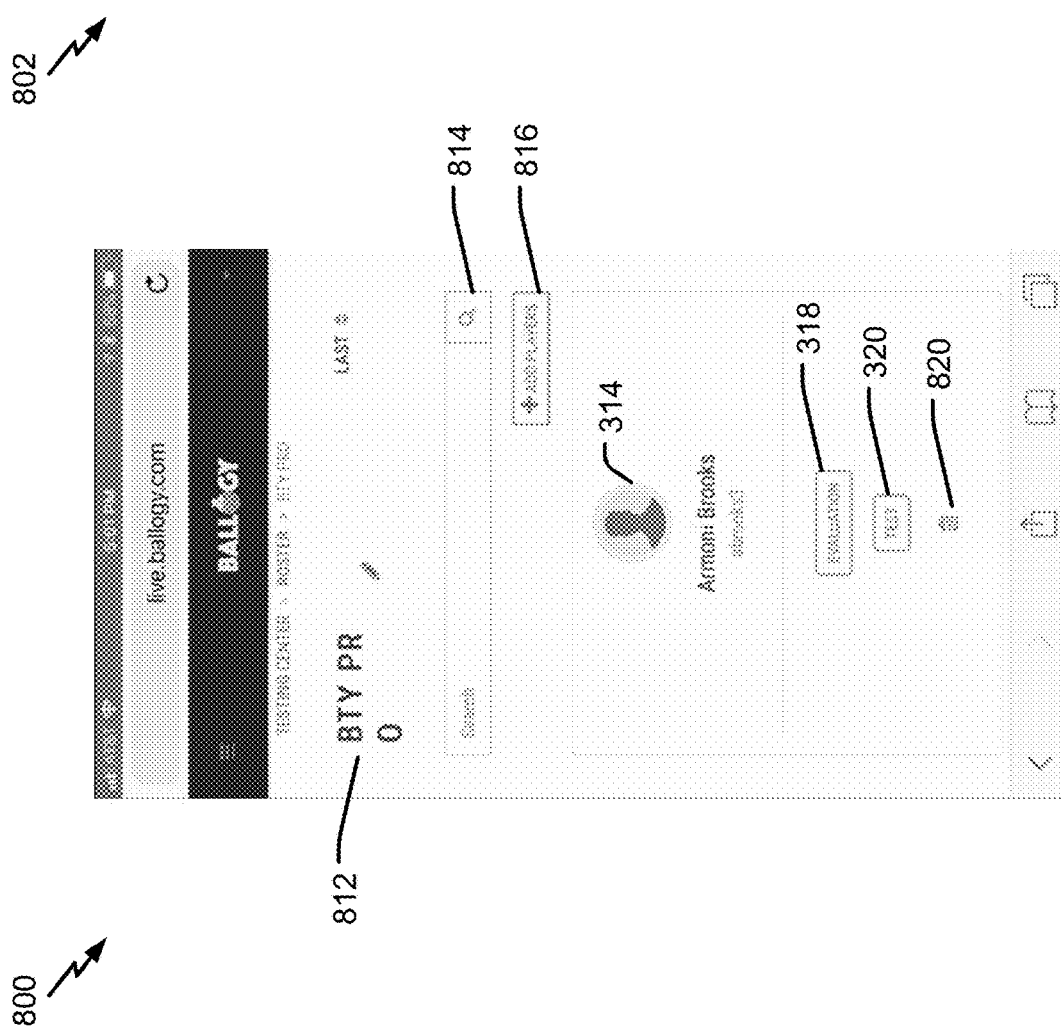

FIG. 8 illustrates examples of testing center GUIs of the sports social media application 128. A third testing center GUI 800 includes information about a selected roster. Responsive to a user activating the view detail button of the first roster 756 (BTY PRO) of the second testing center GUI 702 of FIG. 7, the device 102 outputs the third testing center GUI 800.

As illustrated in the example of FIG. 8, the third testing center GUI 800 includes roster name information 812, a player search bar 814, an add player button 816, and user identification information 314. Although the third testing center GUI 800 depicts only one player user in FIG. 8, in other implementations, the third testing center GUI 800 depicts multiple player users of the selected roster.

The third testing center GUI 800 also includes an evaluation button 318 and a test button, as described with reference to FIG. 3. The third testing center GUI 800 further includes a remove button 820. Selection of the remove button 820 removes the player from the selected roster.

Responsive to a user activating the evaluation button 318, activating the test button 320, or a combination thereof, of the third testing center GUI 800, the device 102 outputs a fourth testing center GUI 802. The fourth testing center GUI 802 corresponds to a combine measurement evaluation GUI and includes information about combine measurements. As illustrated in the example of FIG. 8, the fourth testing center GUI 802 includes a height field 832, a max vertical field 834, a wingspan field 836, a weight field 838, a ¾ court sprint time field 840. In other implementations, the fourth testing center GUI 802 includes other information fields, more information fields, fewer information fields, or a combination thereof.

In some implementations, responsive to a user entering information for all of the fields 832-840 of the fourth testing center GUI 802 or selecting a next or complete button of the fourth testing center GUI 802, the device 102 outputs the third testing center GUI 800. For example, the user may finish evaluating a first user of the selected roster and the user returns to the roster page to select another user to evaluate.

Figure 9:
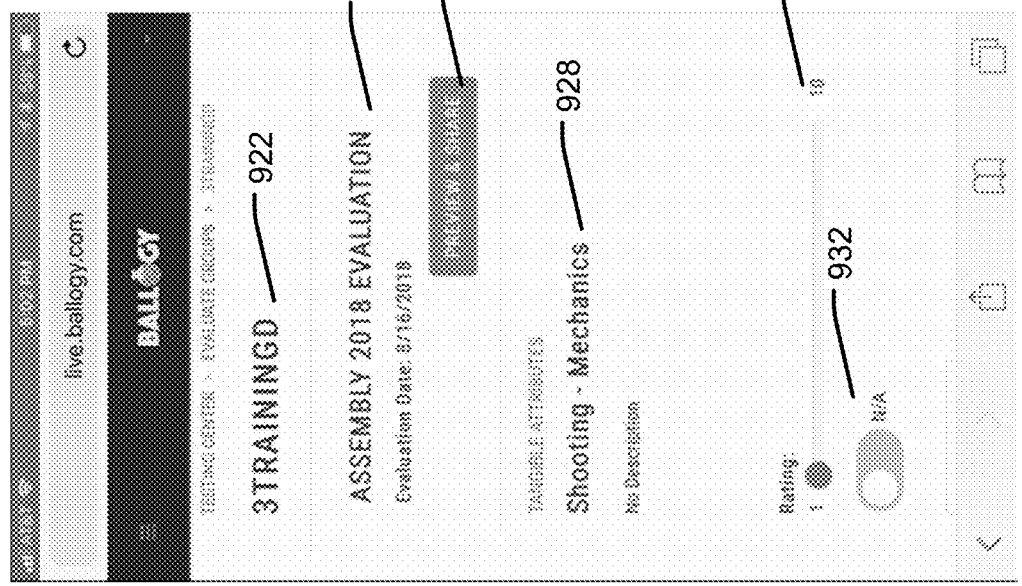
FIG. 9 is a diagram that illustrates examples of GUIs of a sports social media application.
Figure 9:
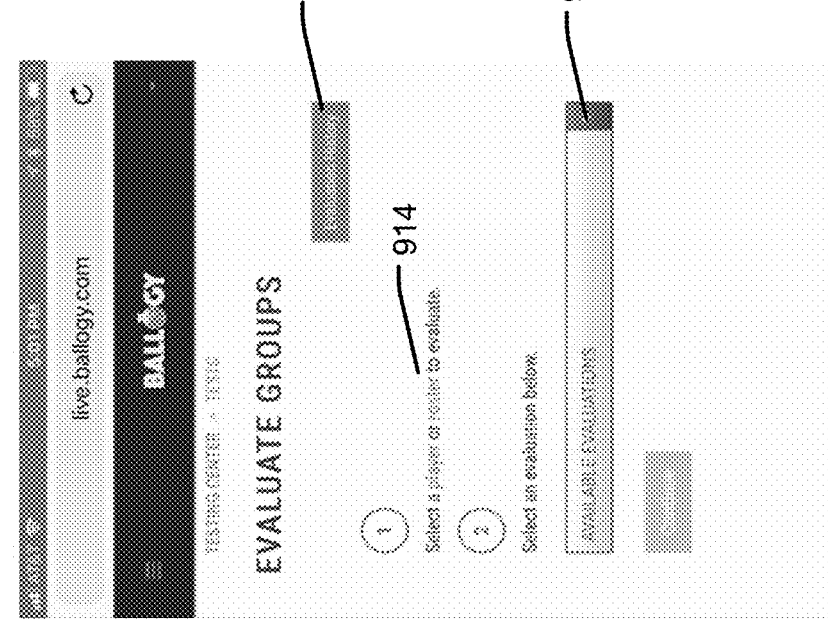

FIG. 9 illustrates another example of testing center GUIs of the sports social media application 128. A first testing center GUI 900 corresponds to an evaluate groups GUI and includes buttons or links to review, assign, and/or perform evaluations. As illustrated in the example of FIG. 9, the first testing center GUI 900 includes an evaluation history button 912, player and roster selection links 914, and an evaluation bar 916.

Responsive to a user activating the player selection link 914 and selecting a player, activating the roster selection link 914 and selecting a roster, activating the evaluations bar 916 and selecting an evaluation, or a combination thereof, the device 102 outputs a second testing center GUI 902. The second testing center GUI 902 corresponds to a selected group evaluation GUI and includes information about a current evaluation. As illustrated in the example of FIG. 9, the second testing center GUI 902 includes a group identifier 922, an evaluation identifier 924, a preview and share button 926, evaluation information 928, a rating slider bar 930, and a toggle switch 932.

Figure 10:
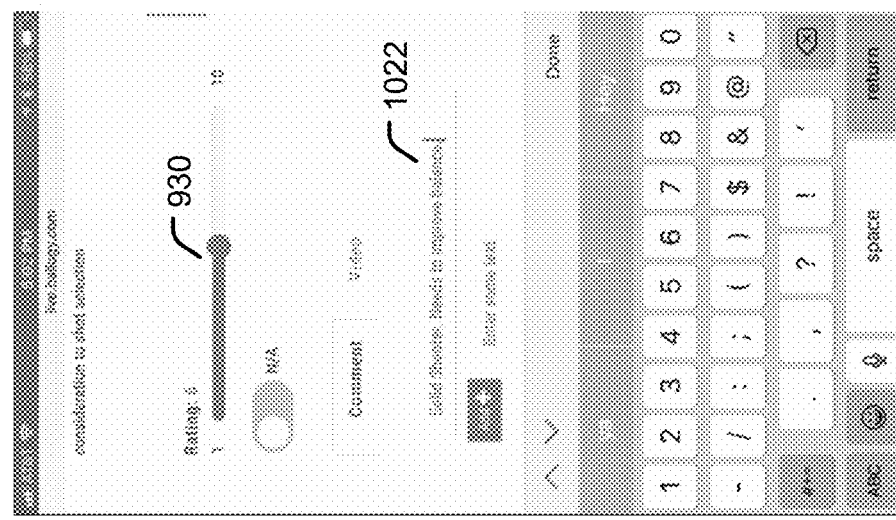
FIG. 10 is a diagram that illustrates examples of GUIs of a sports social media application.
Figure 10:
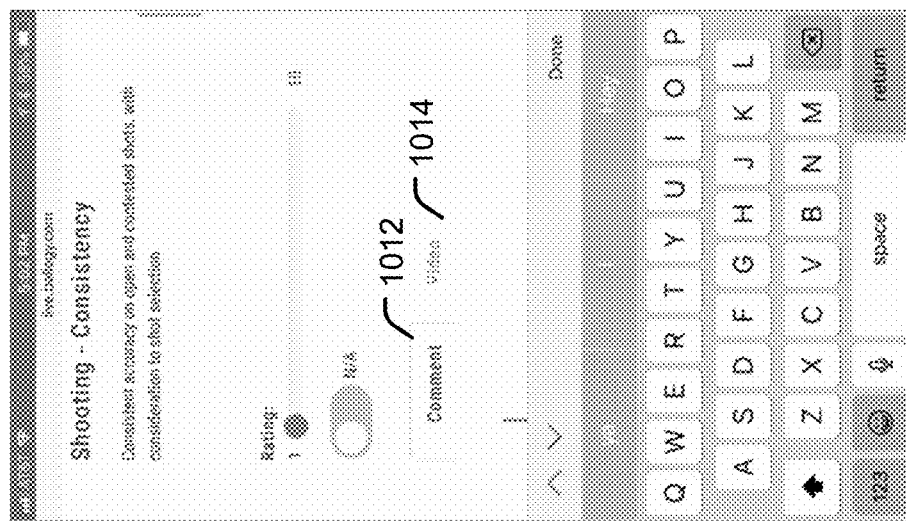

FIG. 10 illustrates examples of testing center GUIs of the sports social media application 128. A third testing center GUI 1000 corresponds to a selected groups GUI and includes fields to insert comments, video, or both. As illustrated in the example of FIG. 10, the third testing center GUI 1000 includes a comments tab 1012 and a video tab 1014. Upon selecting the comments tab 1012, the user can enter comments via text or speech. Upon selecting the video tab 1014, the user can select a stored video to attach, enter a link to a video hosted by another device, generate a video (e.g., initiate video capture by the camera 126 of FIG. 1), or a combination thereof.

A fourth testing center GUI 1002 corresponds to a selected groups GUI and illustrates an evaluation of a player. As illustrated in the example of FIG. 10, the user activated the rating slider bar 930 to a value of 6 and entered a comment 1022.

Figure 11:
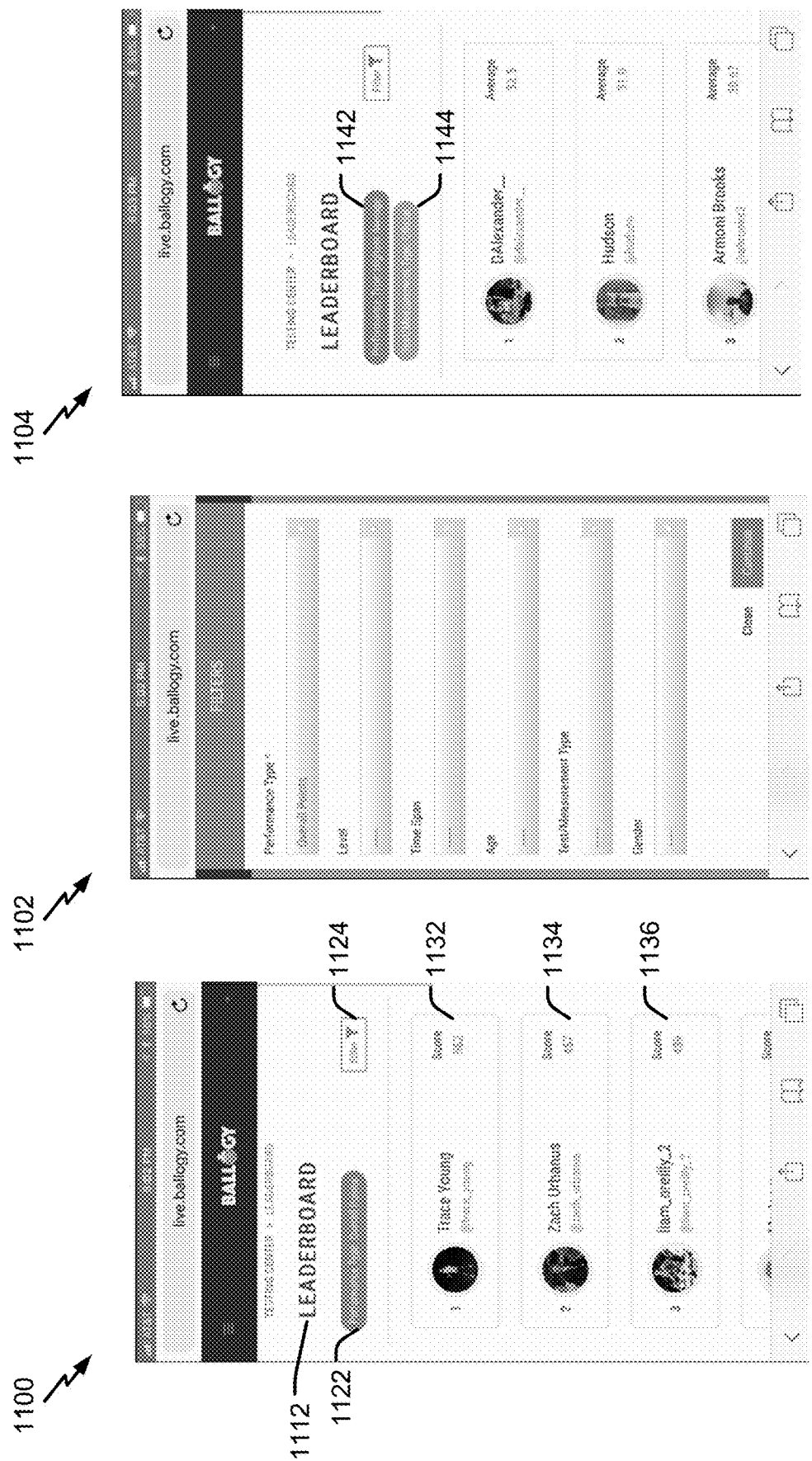
FIG. 11 is a diagram that illustrates examples of leaderboard GUIs of a sports social media application.

FIG. 11 illustrates examples of leaderboard GUIs of the sports social media application 128. A first leaderboard GUI 1100 corresponds to an overall points leaderboard 1112 and includes a first filter type 1122 (performance type: overall points), a filter button 1124, and multiple leader entries 1132-1136. Each leader entry 1132-1136 indicates a user and a score or rank. As illustrated in the example of FIG. 11, each leader entry 1132-1136 includes a rank number, a photo, a name, a username, and a score.

A second leaderboard GUI 1102 corresponds to a leaderboard filter popup and includes multiple leaderboard filter fields. As illustrated in the example of FIG. 11, the second leaderboard GUI 1102 includes a performance type field, a level field, a time span field, an age field, a test or measurement type field, and a gender field. The second leaderboard GUI 1102 is displayed responsive to user selection of the filter button 1124.

A third leaderboard GUI 1104 corresponds to a highest average leaderboard for official tests. As illustrated in the example of FIG. 11, the third leaderboard GUI 1104 includes two active filters 1142 (highest average) and 1144 (official tests). The leader entries of the third leaderboard GUI 1104 are similar to the leader entries 1132-1136 of the first leaderboard GUI 1100. In other implementations, the leaderboard GUIs 1100-1104 includes other information fields, more information fields, fewer information fields, or a combination thereof.

Figure 12:
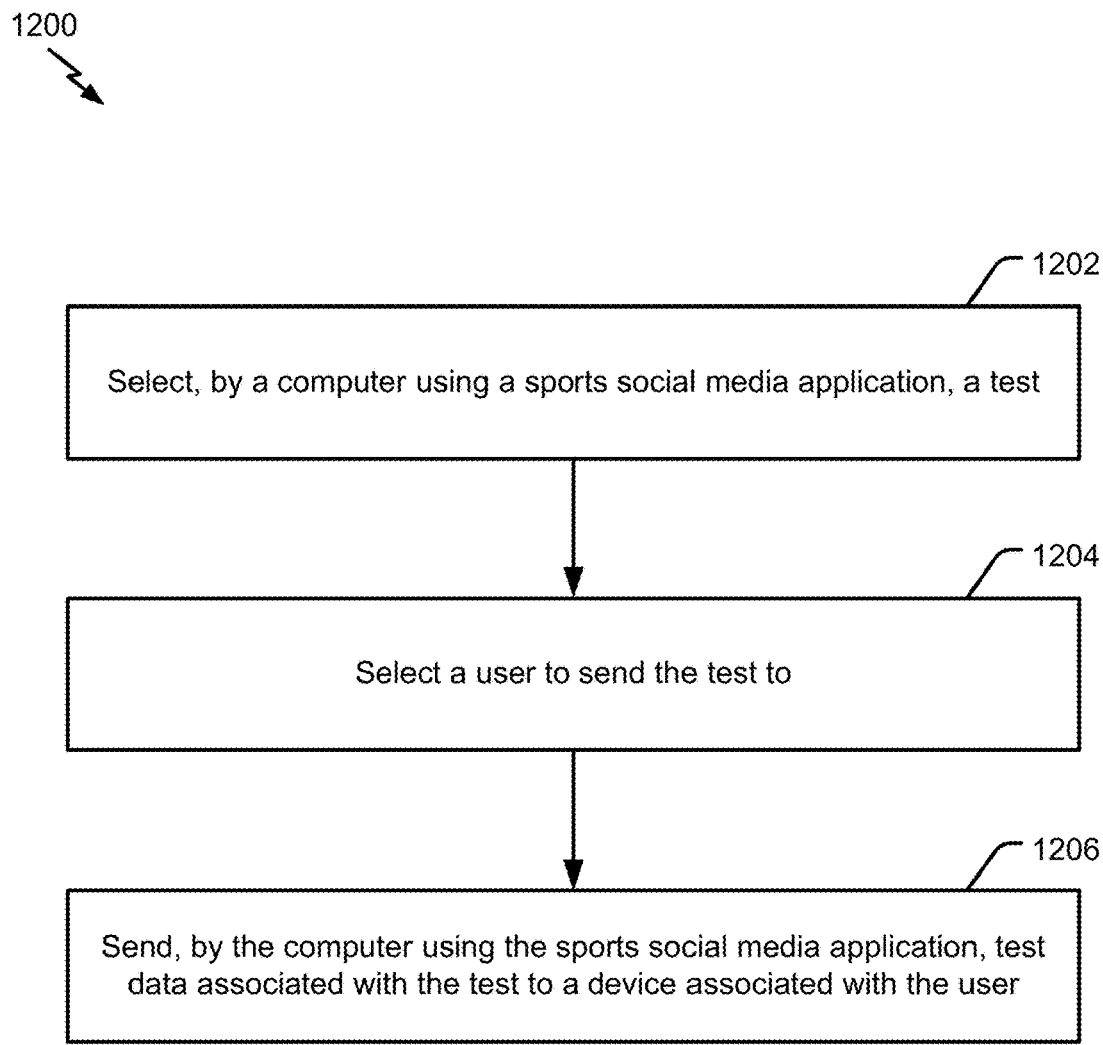
FIG. 12 is a flow chart of an example of a method of selecting and sending a test to a user.

FIG. 12 illustrates a particular example of a method 1200 of selecting and sending a test. The method 1200 may be performed by the system 100, the device 102, the first computer 104, the second computer 106, the third computer 108, the processor 112, or a combination thereof. The method 1200 includes, at 1202, selecting, by a computer using a sports social media application, a test. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the test may include or correspond to one or more of the tests described with reference to FIGS. 1 and 8. To illustrate, the processor 112 of the device 102 selects a test and corresponding test data 142 responsive to a user input, as described with reference to FIG. 1. In some implementations, the test includes a combine measurement, a running drill, a shooting drill, a throwing drill, a hitting drill, a passing drill, or a combination thereof. Alternatively, the processor 112 of the device 102 generates a custom test responsive to user inputs, as described with reference to FIG. 2.

The method 1200 also includes, at 1204, selecting a user to send the test to. For example, the user includes or corresponds to one or more of the users described with reference to FIGS. 1, 3, and 8. To illustrate, the processor 112 of the device 102 selects a player user for the selected test responsive to one or more user inputs, as described with reference to FIGS. 1 and 2. Although selecting a user is depicted as following selecting a test, the two steps can be performed in reverse order, i.e., selecting a test and then selecting a user.

The method 1200 includes, at 1206, sending, by the computer using the sports social media application, test data associated with the test to a device associated with the user. For example, the device associated with the user may include or correspond to the first computer 104, the second computer 106, or the third computer 108 of FIG. 1. To illustrate, the processor 112 of the device 102 sends the test data 142 via the network interface 118 using the sports social media application 128, as described with reference to FIGS. 1 and 2.

In some implementations, the method 1200 further includes prior to selecting the test, creating the test via a custom test builder module (e.g., a test builder application) of the sports social media application, as described with reference to FIG. 2. In a particular implementation, creating the test via the custom test builder module includes adding voice instructions, adding text instructions, or a combination thereof, to the test responsive to user inputs.

In some implementations, the method 1200 further includes receiving, by the computer using the sports social media application, test performance data from the device associated with the user or from a server, as described with reference to FIG. 1.

In some implementations, the method 1200 further includes generating forward projections based on the test performance data and aggregate data, as described with reference to FIGS. 1 and 2. For example, the analytics module 206 generates the forward projections by AI, recurrent neural network, Differential Free Optimization, or a combination thereof. As illustrative, non-limiting examples, the forward projections include expected points, goals, assists, rebounds, blocks, steals, runs scored, at-bats, strikes, outs, or a combination thereof. The aggregate data includes test performance data for other users. The aggregate data may be received by the device 102 from a server or stored locally on the device 102. The aggregate data may correspond to test results for players in which the user has no relationship with, players in which the user has on its roster or player list, or a combination thereof, as described with reference to FIG. 2.

In some implementations, the method 1200 further includes generating team forward projections based on the test performance data and aggregate data, as described with reference to FIG. 2. As illustrative, non-limiting examples, the team forward projections include expected wins, losses, win streaks, loss streaks, win percentage, opponent predictions, weather predictions, or a combination thereof. In some such implementations, the aggregate data includes open domain data (e.g., data outside of social media data, such as betting odds, weather, etc.).

In some implementations, selecting a user includes selecting a roster including the user and one or more other users. In some such implementations, the method 1200 further includes sending the test data to devices associated with the one or more other users, as described with reference to FIGS. 7 and 8.

In some implementations the method 1200 further includes, prior to selecting the user, searching for the user by username, name, affiliation (e.g., school and/or team), or a combination thereof, as described with reference to FIG. 3.

In some implementations the method 1200 further includes generating visuals (e.g., histogram, scatter plot, pie charts, etc.) based on the test performance data, forward projections, or both, as described with reference to FIG. 2.

Figure 13:
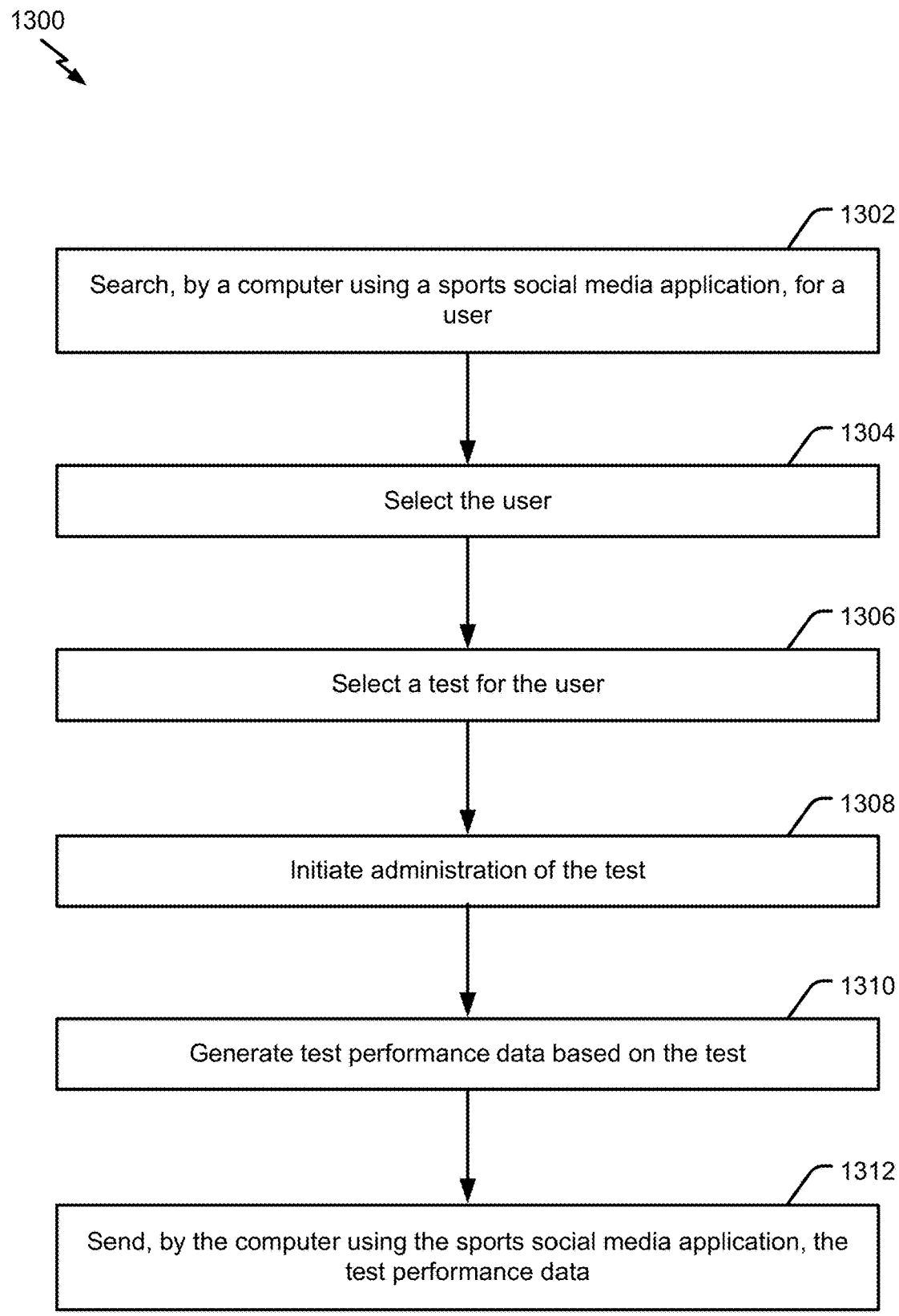
FIG. 13 is a flow chart of another example of a method of selecting and sending a test to a user.

FIG. 13 illustrates a particular example of a method 1300 of selecting and sending a test to a user. The method 1300 may be performed by the system 100, the device 102, the first computer 104, the second computer 106, the third computer 108, the processor 112, or a combination thereof. The method 1300 includes, at 1302, searching, by a computer using a sports social media application, for a user. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the user may include or correspond to one of the users or players described with reference to FIGS. 1, 3, and 8. To illustrate, the processor 112 of the device 102 searches for player responsive to user inputs, as described with reference to FIGS. 1, 3 and 8. In some implementations, the test includes a combine measurement, a running drill, a shooting drill, a throwing drill, a hitting drill, a passing drill, or a combination thereof.

The method 1300 includes, at 1304, selecting the user. For example, the processor 112 of the device 102 selects a player user from the search results or from a roster responsive to user inputs, as described with reference to FIGS. 1, 3 and 8. The method 1300 includes, at 1306, selecting a test for the user. For example, the test may include or correspond to one or more of the tests described with reference to FIGS. 1 and 8. To illustrate, the processor 112 of the device 102 searches for a test from a list of test and selects a test responsive to user inputs, as described with reference to FIGS. 1, 3 and 8. Alternatively, the processor 112 of the device 102 creates a custom test responsive to user inputs, as described with reference to FIG. 2.

The method 1300 includes, at 1308, initiating administration of the test. For example, the processor 112 of the device 102 starts the selected test, as described with reference to FIGS. 1, 3 and 8. The method 1300 includes, at 1310, generating test performance data based on the test. For example, the test performance data may include or correspond to the test performance data 144 or the official test performance data 182 of FIG. 1. To illustrate, the processor 112 of the device 102 generates the test performance data 144 based on user inputs, sensor data, video data, or a combination thereof, as described with reference to FIGS. 1, 3 and 8.

The method 1300 includes, at 1312, sending, by the computer using the sports social media application, the test performance data. For example, the processor 112 of the device 102 sends the test performance data 144 to one or more devices or computers, as described with reference to FIGS. 1, 3 and 8.

In some implementations, the method 1300 further includes generating, by the sports social media application, a second test, coaching tips, or both, based on the test performance data. For example, the processor 112 of the device 102 automatically or semi-automatically creates a custom test or selects a second test to for the player user based on the test performance data 144. To illustrate, the analytics module 206 determines that the player user is more proficient at corner three-point shots than straight on three-point shots, and the analytics module 206 instructs the test module 202 to generate a custom test to practice more straight-on three-point shots. As another example, the processor 112 of the device 102 automatically or semi-automatically selects a coaching tip from a list of coaching tips based on the test performance data 144. To illustrate, the analytics module 206 selects "a keep arm up on follow through" tip based the test performance data 144 and video data included therein.

In some implementations, the method 1300 further includes receiving notes into the sports social media application, capturing video and performing machine vision analysis on the video, indicating performance results via user inputs, or a combination thereof, during administration of the test. For example, the processor 112 of the device 102 generates note data responsive to user speech during the test. To illustrate, the voice-to-text converter 216 generates text data based on audio data of user speech. As another example, the camera 126 of the device captures video of the player user taking the test. In some implementations, the camera 126 captures the player user in the video, and in other implementations, the camera 126 captures the result only (e.g., is fixed on the basket and net rather than the player). The machine vision module 224 performs machine vision on the video to validate or certify the test performance data 144. As yet another example, the processor 112 of the device 102 generates the test performance data 144 responsive to user inputs. To illustrate, the user inputs player makes and misses via the make and miss buttons 528, 530 of the fifth testing center GUI 500 of FIG. 5.

In some implementations, sending the test performance data includes publishing the test performance data via the sports social media application. For example, the network interface 118 of the device 102 sends the test performance data 144 (e.g., public test result data) to the second computer 106 for publishing or associating with the player user. Additionally or alternatively, sending the test performance data includes sending the test performance data to a device associated with the user. For example, the network interface 118 of the device 102 sends the test performance data 144 (e.g., public or private test result data) to the first computer 104. To illustrate, the sports social media application 128 (or the sports social networking application 208 thereof) sends the test performance data 144, via the network interface 118, to the second computer 106 which forwards the test performance data 144 to the first computer 104.

Figure 14:
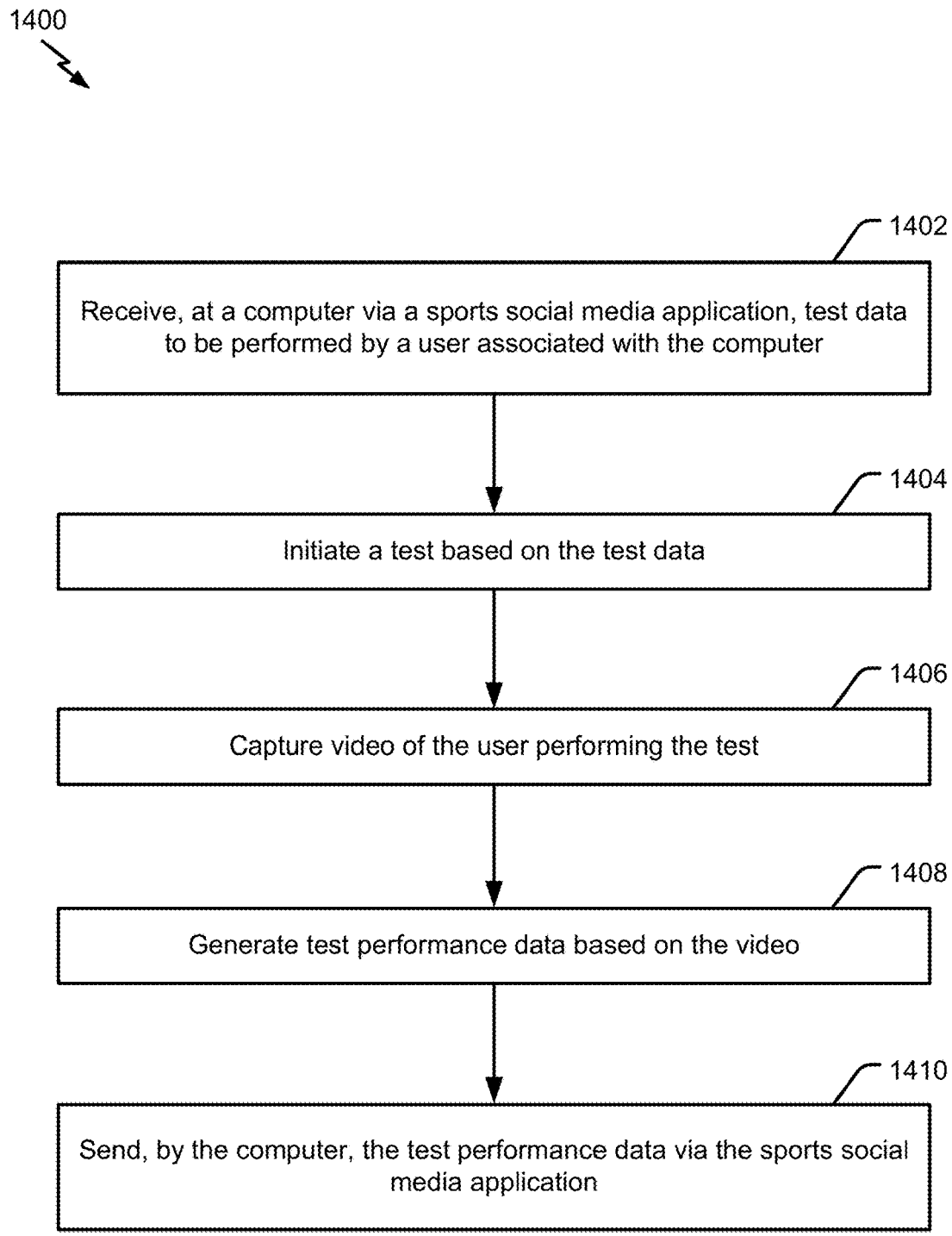
FIG. 14 is a flow chart of yet another example of a method of receiving and performing a test.

FIG. 14 illustrates a particular example of a method 1400 of receiving and performing a test. The method 1400 may be performed by the system 100, the device 102, the first computer 104, the third computer 108, the processor 112, or a combination thereof. The method 1400 includes, at 1402, receiving, at a computer via a sports social media application, test data to be performed by a user associated with the computer. For example, the computer may include or correspond to the device 102, the first computer 104, or the third computer 108 of FIG. 1. The sports social media application may include or correspond to the sports social media application 128 of FIG. 1 or the sports social networking application 208 of FIG. 2. The test data may include or correspond to the test data 142 of FIG. 1, and the user may include or correspond to one of the users or players described with reference to FIGS. 1, 3, and 8. To illustrate, the processor 112 of the device 102 receives test data indicating a particular test that was assigned to the user associated with the device, as described with reference to FIG. 1.

The method 1400 includes, at 1404, initiating a test based on the test data. For example, the test may include or correspond to the one or more of the tests described with reference to FIGS. 1 and 8. To illustrate, the processor 112 of the device 102 displays a test GUI, such as the fifth testing center GUI 500 of FIG. 5, responsive to user inputs (e.g., activating start button 512).

The method 1400 includes, at 1406, capturing video of the user performing the test. For example, the camera 126 of the device 102 captures video of the player performing the test and generates video data, as described with reference to FIGS. 1 and 2.

The method 1400 includes, at 1408, generating test performance data based on the video. For example, the test performance data may include or correspond to the test performance data 144 or the official test performance data 182 of FIG. 1. To illustrate, the machine vision module 224 performs machine vision on the video data to generate the test performance data 144. Additionally or alternatively, the user or another person inputs scores into the device 102 using the GUI, such as the fifth testing center GUI 500 of FIG. 5, and the machine vision module 224 validates or certifies the scores to generate certified or validated test performance data 144 by performing machine vision on the video data.

The method 1400 includes, at 1410, sending, by the computer, the test performance data via the sports social media application. For example, the network interface 118 of the device 102, the first computer 104, or the third computer 108, sends the test performance data 144 (e.g., public test result data) to the second computer 106 for publishing or associating with the player user. As another example, the network interface 118 of the first computer 104 or the third computer 108 sends the test performance data 144 (e.g., public or private test result data) to the device 102. To illustrate, the sports social media application 128 (or the sports social networking application 208 thereof) sends the test performance data 144, via the network interface 118, to the second computer 106 which forwards the test performance data 144 to the device 102.

In some implementations, the method 1400 further includes generating voice instructions based on the test data. For example, the text-to-voice converter 214 generates audio based on test of the test data 142, and the speakers 124 outputs the audio which includes instructions for taking the test.

In some implementations, the method 1400 further includes, responsive to receiving the test data, generating a notification, an entry in a feed of the sports social media application, or both. For example, the sports social networking application 208 updates the GUI to generate a notification or an entry in a feed, as described with reference to FIG. 1.

Basketball is a sport where there is only a single way to score—a basketball must travel through a basketball hoop in a specific direction (from above the hoop to below the hoop). In accordance with an aspect of the present disclosure, computer vision-based systems and methods are configured to automatically detect whether a basketball shot was made or missed. The system may utilize video feeds from multiple cameras or from a single camera. Advantageously, the camera(s) need not be stabilized (e.g., on a tripod) or in any specific area/location, and the shooter need not be included in a camera field of view.

In a particular aspect, a camera is positioned such that a basket is within the field of view of the camera. As used herein, the term "basket" or "goal" refers to the combination of a basketball hoop and a net attached to the basketball hoop. The camera need not be in any particular location, and may be positioned at any height, including near the floor. For example, the camera may be part of a mobile phone that has been set on the floor and leaned up against a wall or an object. The camera also need not be stationary or affixed to a tripod. Rather, the described techniques work with a mobile phone camera pointed at the basketball hoop by a non-shooter that may be moving around the basketball court. Multiple additional non-shooters may also be in the field of view of the camera without impacting the make/miss determinations.

Figure 15:
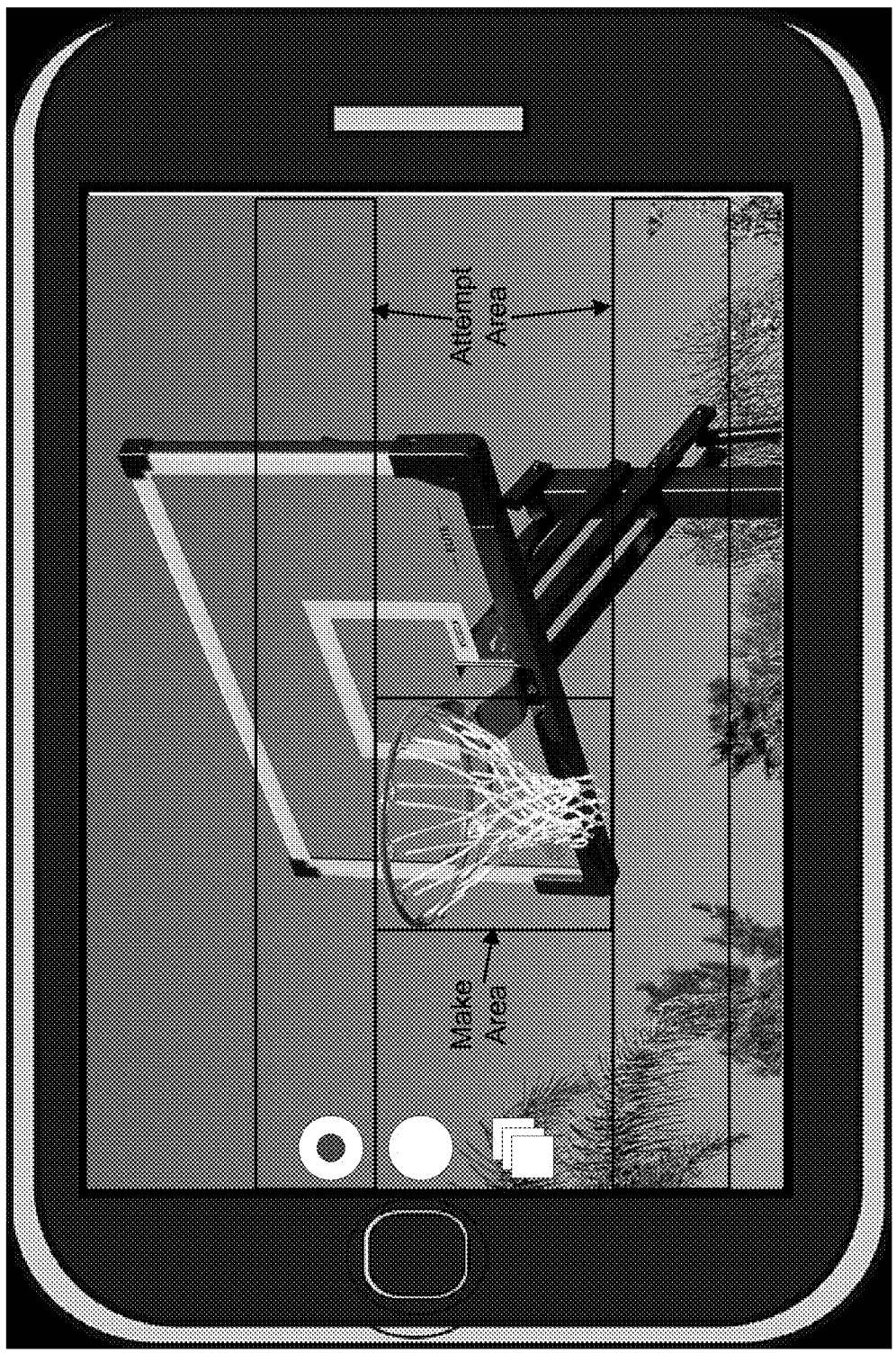
FIG. 15 illustrates an example of a camera field of view.

FIG. 15 illustrates an example of a camera field of view. Although FIG. 15 illustrates a view of a basketball hoop from a particular angle, it is to be understood that the camera can be positioned at any angle relative to the basketball hoop as long as the hoop and attached net are within the field of view and as long as a basketball travelling downwards through the hoop is distinguishable.

In a particular aspect, a neural network object recognition engine is executed on the device that includes the camera (e.g., a mobile phone) or on a device that receives video from the camera (e.g., a hardware computer appliance that communicates with the camera via wired, wireless, or internet/LAN connection). The object recognition engine may be trained on hundreds of thousands of images and videos of basketball makes and misses. Once trained, the engine may be configured to automatically detect the basketball, basketball hoop, net, backboard, free throw line, three-point line, baseline, sidelines, etc. in the field of view. In one example, the user provides input confirming that the hoop and net were correctly detected by the object recognition engine and correctly marked on screen by a bounding box (or other visual indicators) generated by the engine. In some implementations, the user may optionally confirm the color(s) of the basketball hoop and/or net.

As explained above, the shooter need not be present in the camera's field of view for the make/miss determination to occur. If the shooter is present, however, then release of the basketball from the shooter's hand may trigger a start of the make/miss detection algorithm. If the shooter is not visible in the field of view, the algorithm may be triggered by the appearance of the basketball in an "attempt area." In the example of FIG. 15, the attempt areas are above and below the basket across the width of the camera field of view. In an alternate example, a single attempt area includes both of the attempt areas shown in FIG. 15 (and optionally some additional areas, such as left and right of the basket in the field of view).

Figure 16:
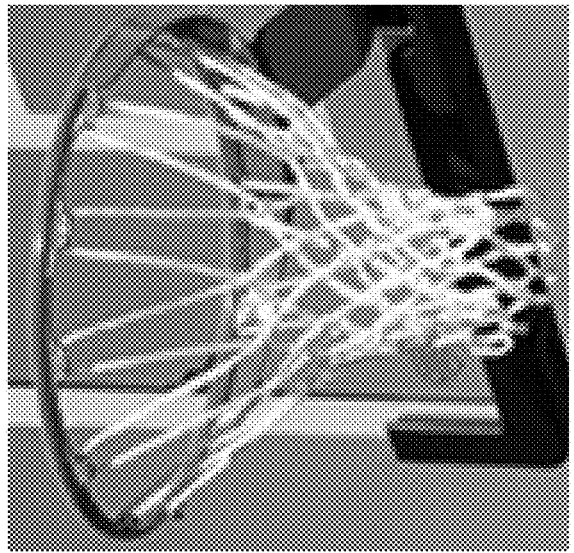
FIG. 16 illustrates a portion of the camera field of view of FIG. 15.

In addition to attempt area(s), a make area may also be identified. As shown in FIG. 15, the make area corresponds to an area that includes, e.g., just the hoop and net. In a particular example, a reference frame is generated from the make area, as shown in FIG. 16. The reference frame may be color filtered so that only pixels that are the color(s) of the hoop and/or net are left behind.

In a particular aspect, changes in pixel coloring are used to detect whether a shot attempt was a make or a miss, based on a known color of the basketball being shot. For purposes of illustration, the basketball is assumed to be orange and the net is assumed to be white, though it is to be understood that basketballs, hoops, and nets that are a different color or multiple colors may also be used in conjunction with the described techniques. To determine whether a basketball has entered the make area, the make/miss detector determines whether there has been at least a threshold increase the number of ball-colored (e.g., orange) pixels (or a ratio of ball-colored pixels to non-ball-colored pixels) in the make area as compared to the reference frame. If such an increase has occurred, the make/miss detector determines whether the orange pixels are interspersed with net-colored (e.g., white) pixels. If such interspersion exists, a make may be detected, because the interspersion may indicate that the basketball is within the net rather than some arbitrary distance behind the net.

In some examples, the shape of the net is also tracked to determine if the shape of the net changes or changes in a particular way (e.g., bulges) as the ball passes through the net. Thus, a make may be detected in response to the interspersion of net-colored pixels with ball-colored pixels in the make area and/or a change in the shape of the net in the make area.

Conversely, if there was an increase in ball-colored pixels in the make area but no interspersion of net-colored pixels and/or no change in net shape, a miss may be detected. If the basketball is detected within the attempt area(s) and then leaves the attempt area(s) without entering the make area, a miss may be detected. If vertical coordinates (e.g., y-axis on-screen pixel coordinates) of the basketball become lower than the make area after earlier behind higher than the make area, a miss may be detected.

As indicated above, the make/miss detector may operate even if the camera is not stationary. In this case the attempt area(s), make area, and/or reference frame may be determined in real-time (or near-real-time) based on corresponding real-time (or near-real-time) detection of the hoop and net. Thus, in some examples, an object tracking engine may be executed in addition to or instead of merely an object detection engine, and the object tracking engine may track the hoop, net, etc. from frame to frame in the video being captured by the camera. In a particular aspect, object tracking is performed based on detection and tracking of keypoints/feature from frames of video. Keypoints/features can include corners, edges, areas with high or low color variation, etc. Examples of keypoint/feature detectors include, but are not limited to, scale invariant feature transform (SIFT), speed up robust feature (SURF), robust independent elementary features (BRIEF), oriented FAST and rotated BRIEF (ORB), KAZE, accelerated KAZE (AKAZE), binary robust invariant scalable keypoints (BRISK), etc.

In some examples, multiple cameras are used for make/miss detection. For example, five cameras may be pointed at the basket from each of five different positions: two corners, two wings, and straight-on from at or beyond the free throw lane (also known as the "key"). Video from each of the cameras may be analyzed as described above, resulting in five make/miss determinations. Each such determination may optionally be accompanied by a confidence level that is output by the make/miss detector. The make/miss determinations may be aggregated as "votes" (optionally weighted by confidence value) to determine the overall make/miss indication. Make/miss data may be stored at one or more electronic devices, such as device(s) that include the cameras in use, a cloud-accessible server, etc. In some cases, make/miss data may be stored in conjunction with a profile of a user that is shooting the basketball. When the shooter is within a field of view, the make/miss detector may also determine an on-court location of the shooter. Such shooting location information may also be stored and may enable determining various metrics regarding the basketball shooter, as further described herein.

In particular aspects, object recognition and tracking are applied to identify the basketball and basketball player(s) in the field of view of the cameras. Thus, the described system may be used in both practice scenarios as well as game scenarios. Movement of players relative to each other, relative to landmarks on the basketball court, and/or relative to the ball may be tracked to determine various metrics and gain various insights into game flow, as further described herein. In some implementations, make/miss data is also stored in a tabular, structured format and made available for training neural networks configured to predict player performance, as further described herein.

In an alternate implementation of the make/miss detector, a neural network classifier is trained using a supervised learning process, where training data includes short video clips of makes and misses. Based on the training data, the neural network may "learn" what kinds of color/shape changes correlate to makes and to misses, respectively. During use, the classifier may receive frames of video as input and may output whether the frames correspond to a make or a miss, optionally with confidence values (e.g., 0.9 make, 0.1 miss). In an example, a classifier is trained for each of multiple camera poses, and a particular classifier is selected for use after a pose estimation algorithm determines which of the classifiers is "closest" to a current pose of the camera. The pose estimation algorithm may determine an angle between the camera's field of view and the basket based on relative orientations and positions of the camera, hoop, net, backboard, on-court landmarks, etc.

While the foregoing section describes the use of multiple cameras for make/miss detection, in a particular embodiment video from multiple cameras may be "stitched" together to gain a more complete, three-dimensional (3D) understanding of ball and player movement during a practice or game scenario and to more accurately determine metrics regarding individual players and groups of players.

For example, cross-references may be automatically set up between frames of video feeds received from multiple cameras. The frames of the videos may have universal timestamps, which may be used to synchronize the video feeds. The resulting aggregated video data may be used to perform various analyses. Because most spectators will capture video of individual players of interest to them (e.g., parents capturing video of their child), an extensive amount of video data can be collected regarding individual players. Fixed cameras placed around the basketball court can also contribute to the aggregate video data. The fixed cameras may tag video frames with information (e.g., pose information, zoom information etc.) that can be used to determine what portion of an overall, maximally zoomed out field of view was captured in that frame. In some cases, one or more players, game officials, or coaches are equipped with a wearable camera to capture video data that can be used by the systems and methods disclosed herein.

In a particular aspect, cameras may push short video clips for events of interest to the cloud rather than all video from a recording session (e.g., clips of video including a few seconds prior to and/or before a detected make or a miss). Doing so may help alleviate possible privacy concerns, especially when the players are minors. In one implementation, point cloud technology is used to synchronize and arrange the multiple video feeds. Each received video clip may be tagged with location data and universal timestamps, and a first order filter may be generated to identify videos that are likely to correspond to the same basketball game. The videos may be processed using feature extraction algorithms, which identify and tag certain landmarks in the video that can be used to arrange the 2D (two-dimensional) videos as "views" of a common 3D space corresponding to the basketball court. In some examples, fixed landmarks on and around the basketball court are pre-identified during configuration time, so that later-received videos of game footage can quickly be arranged in the "known" 3D space. Landmarks used to arrange videos may include corners, edges, lines, etc., although different algorithms may extract different features. In some cases, landmarks may be dynamic. For example, if a first video clip bearing a particular same universal timestamp shows a basketball moving towards the camera, and a second video clip bearing the same universal time stamp shows the basketball moving towards the camera, it can be concluded the cameras, at least for the period of time in question, were on opposite sides of the basketball court from each other.

A 3D point cloud representation of the basketball court may be generated using the videos and the tagged features. In a particular embodiment, determining the 3D point cloud representation includes generating depth map information from received video clips. It is to be understood that some of the received video clips may include "stereo" video by virtue of being generated by a standalone or mobile device-integrated stereoscopic camera. Convolutional neural networks (preferable for image data) and/or recurrent neural networks (preferable for video data that has temporal dependencies) may be trained based on prior practice/game footage, and the trained neural networks may be used to identify particular game flow events, such as baskets, fouls etc. In a particular embodiment, neural network output may be fused with manual tagging output and/or user (e.g., coach) output to further refine the neural network. Eventually, the neural networks may be configured to accurately determine different basketball events based on collected video from multiple (e.g., crowdsourced) devices.

Thus, during live games or practice sessions, various cameras may send video to the an "AI appliance," such as a computing device that is either on-site at the basketball court or off-site (e.g., in the cloud). In some cases, the video may be sent by a sports social media application, which is further described in one or more appendices to the present document. After the videos are "stitched" together AI models may determine various items from the aggregate video data. The AI models may receive information other than the aggregate video data. For example, the AI models may receive game flow information, which may include timestamped on-court events, such as makes, misses, fouls, timeouts, player substitutions, etc. In a particular embodiment, such game flow information may be automatically ingested from a live scoring engine that is being employed by an official scorer for the basketball game. Using such game flow information, the AI models can determine which ten players (five on each team) are on court at any given time, and therefore can determine statistics for both individual players as well as for on-court groups of players. To illustrate, the AI models may determine performance of individual players (independent of other players, when certain teammates are on the floor, when certain opponents are on the floor), strategy of a team in various situations, etc. When combined with recognition models that have been trained to identify specific basketball events, such as screens/picks, defensive switches, man-to-man defenses, zone defenses, etc., the AI models can identify specific plays that are being run by a team during a particular game situation. Use of such information is further described herein.

In a particular aspect, machine learning models, such as recurrent neural networks, are trained to predict current/future player performance based on scores players have achieved on various basketball drills and tests, such as drills and tests described with reference to one or more appendixes to the present document. Training of various models referenced herein may be performed using backpropagation, differential free optimization (DFO), network optimization methodologies employed in capsule networks, etc. Additional data items may also be included in the training data, such as wins/losses, whether a game was at home or away, weather conditions (e.g., if the game was outdoors), date/time of game, betting odds on players/teams, etc. "Performance" in the context of basketball may be represented by numerical statistics (e.g., points, rebounds, assists, etc.), rate statistics (e.g., shooting percentage, free throw percentage, etc.) statistics, and/or a different metric.

In some cases, predictive models may additionally/alternatively have been trained based on development curves of other players that are similar to a player of interest, for example in terms of age, height, weight, practice habits, etc. Thus, training data may not just include a particular player's own data, but also data of other players. As such, if a player exhibits a sequence of performances in his or her last N games (N being an integer greater than 1), where those performances are $S_0 \ldots S_N$, then the performance expectation for the next game ($S_{N+1}$) may be output by the predictive model based on the last k games (k<=n) of the player in question (as an input to the model) and the prior training of the model, which included performance sequences for other players. The predictive model can also determine, based on a player's historical in-game performances and/or test scores, the players future in-game performances and test scores. Such predictions may be useful for recruiting and scouting purposes, as further described herein.

The predictive models described herein may accept more than just test scores and player performances as input. Other forms of input include data extracted from automated video analysis of player game film/highlights, as further described herein. In some examples, the predictive models can also predict a likely cause of individual player "failure" (e.g., players playing so many minutes in the first half of the season were likely to be injured or fatigued come playoff time, players having so high a three point percentage during the first few games of the season were likely to see their three-point attempts decrease as a result of opposing teams doublet teaming the players, etc.).

In some cases, the predictive models may output predictions based at least in part on input indicating physical attributes of players. For example, the predictive models may receive as input (and may have been trained using data that included) player age, player height, player weight, player wingspan, player stationary vertical jump, player running vertical jump, amount of time spent practicing particular types of shots or performing particular types of tests/drills, player speed/conditioning test results, etc.

In one example, a predictive model, given data regarding of past test results and frequency of tests, outputs a prediction indicating the likelihood that a player will become a better shooter, the likelihood that the player has "plateaued" unless a substantial change occurs, etc. Such predictions may also be coupled with an explanation (e.g., the player is unlikely to improve free throw percentage because of inconsistent shot mechanics that have been observed time and again).

In some cases, predictive models may effectively benchmark how players in various age brackets and at each position measure up "skill-wise" against other players on a leaderboard. A sports social media application may provide benchmarks at each age bracket and each position and display a visual indicator (e.g., graph) of where the player is at each level of development (and how the player is projected to improve) as the player attempts to reach the ultimate benchmarks in various category. Along the way, the player may be rewarded with virtual "medals," and then virtual "trophies" and/or a certificate when the player achieves the benchmarks. Because AI-determined measures are objective, when a player earns a particular medal, trophy, or certificate, this event can be leveraged with recruiters and scouts.

In a particular embodiment, from a data science perspective, a player prediction models may be generated based on exploratory data analysis (EDA). Several steps may be taken to identify relationships between variables and performance. Such variables may or may not include height, weight, wingspan, agility, jump height, heart rate (for example, measured by a wearable device in Bluetooth communication with the player's phone), body fat composition, conditioning test scores, etc., and the variables may be plotted these variables against a measure of performance, such test/drill scores. From such basic plots, variables that might be playing a role in determining performance can be identified, such as by using principal component analysis (PCA), dimensionality reduction, or another technique. Multivariate data analysis may be used to construct a multivariate model to predict performance. Over time, as available data increases and is fed into the model, model accuracy may be improved.

In a particular aspect, AI may be used to automatically suggest, to a player or coach, what specific tests/drills a player or team should focus on the next week/month/year to reach some specified goal. The goal (e.g., be able to dunk, shoot 40% from three-point range, etc.) may be set by the player, the coach, or both player and coach in collaboration. An AI model may receive player information and historical test scores as input. The AI model may have been trained based on development curves of other players and data indicating what tests/drills were performed by such players at what times. The AI model may output a suggestion of one or more tests/drills that are correlated with desired player development curves for other players (or even that same player, if that same player's information was in the training data).

For example, if performing "Drill A" helped Jill increase her free throw shooting 5% over the summer, then, diminishing return possibility notwithstanding, the AI model may output that a suggestion that continuing to use Drill A at least some of the time has a good likelihood of further improving Jill's free throw shooting. In some examples, such functionality can be part of a QUICKSTART option in the sports social media app. For example, a player that just installed the app on their phone can simply turn on video capture within of the app and start shooting around. After sufficient video is collected and analyzed, the app can intelligently recommend specific drills to work on, neighborhood coaches, etc. Examples of recommendations may include "improve vertical leap," "pull your right elbow in towards your body when you take a jump shot," etc. The same technology can suggest specific items for players or coaches to practice based on analysis of previous game film of the team and even the upcoming opponent.

It is to be understood that there are great shooters that do not have what experts would consider "perfect shooting form," just like there are average shooters with "good shooting form." In a particular embodiment, instead of or in addition to a simple shootaround, the player takes a specific evaluation test, the results of which can be used to understand more about the player's physical measurements, athletic performance, skill set, good shooting habits/bad shooting habits, etc.

In some cases, after sufficient video of a player is captured and analyzed, the app presents an identification of weak/strong shooting zones (i.e., heat maps) for the player and also outputs a personalized drill plan for the player so that they can work on their weaknesses while maintaining their strengths.

In a particular aspect, AI (e.g., clustering models) may be used to find players fitting (or projected to fit) a specific archetype. Such players may be identified based on the players' historical test scores, and optionally data extracted from automated video analysis of game/practice film. Such AI-assisted player search may be especially valuable for recruiting purposes. For example, a recruiter (e.g., college basketball coach) may specify what type of player they are looking for in the sports social media app. The recruiter may provide a set of criteria that describes the desired player archetype in terms of performance variables specific to the sport of the recruiter's interest. A machine learning predictive performance model (which may be recurrent neural network-based, as described above) may then projects future player performance for a range of players, based on the past performance data the model has been trained on. The multi-variate description of the recruiter's desired performance requirements may be matched against the predicted performance of players. This matching can be performed using a range of techniques, including but not limited to RMSE (root mean square error). In another example, a machine learning model encodes the recruiter's performance requirements into one or more cluster labels (e.g., using an autoencoder) and then returns other players that are in the same cluster (or region of multidimensional space) as the cluster labels.

One issue that commonly occurs when evaluating players is discrepancies between player-provided physical attributes and objectively measured physical attributes later on. In particular aspects, the described techniques enable automatically authenticating a player's profile traits. Doing so reduces or eliminates the chances that there is a mistake or intentionally deceptive entry of physical attributes, such as size, vertical, wingspan, etc.

In one implementation, the sports social media app instructs a player how to generate verified profile traits. As an illustrative non-limiting example, the player may be instructed set their mobile device camera down in a position such that a basket and certain on-court landmarks, such as the three-point line, free throw line, etc. are within the field of view. Next, the player may be instructed to step into the camera's field of view (without moving the camera) and perform certain tasks. Based on size ratios of various landmarks and/or the basket, the app may determine, with a high degree of precision, the player's height, wingspan, standing reach, hand size, no-step vertical leap, max vertical leap, lane agility, sprint speed, etc.

In an alternate example, the player may be instructed to download and print a chart and place the chart in the camera's field of view. The app may use markers on the chart to calibrate measurements, after which the player is instructed to step into the field of view and perform certain tasks. In some cases, the tasks may also include ball handling speed drills, shooting drills, etc. as a primary evaluation of the player, which may in turn enable creation of custom workouts, the player to be found by recruiters, custom coaching suggestions, etc.

As described in one or more appendices to this document, a user (e.g., coach) may use the sports social media app to visually define a new test and then "push" the new test to players, who can use the sports social media app to see the test, perform the test, and report results back to the coach. Based on the coach's proclivities, the type of offense/defense the coach's team runs, and past/current/projected player development (both on an individual player basis as well as an aggregate team basis), AI models may automatically create new test/drill packages. Certain tests/drills may be recommended for all players on the team, whereas others may be recommended for specific players (e.g., ball handling drills for backcourt players, post drills for frontcourt players, etc.).

For individual players, workouts can be created in response to their individual weaknesses. For groups of players or a team, various factors may be used to determine what kind of workout to generate. To illustrate, based on film of an upcoming opponent and data extracted from that film, a coach can be shown predictions of how the opponent will likely will guard certain players, plays, and actions. For example, a coach's team runs a ball screen offense. Data on the upcoming opponent indicates that they will switch ball screens 90% of the time unless the screen is set by the center (in which case they "drop" the ball screen). Based on these factors, the app may generate animations of suggested plays, for example a play in which the fact that the center will drop the ball screen can be taken advantage of to free up a shooter, a play in which the 90% switching tendency is used to isolate a player skilled at driving to the basket against an opposing player with low lateral agility, etc. In some cases, animations for the suggested plays (and the expected opposing defense) can be automatically generated and shown to the coach, and workouts may be automatically created so that the players practice such plays.

Based on object detection, recognition, and tracking across frames of video, in addition to collision resolution, the described techniques may enable tracking of individual players throughout a game. AI models may perform an extra layer of analysis on the video to determine basketball-specific events. For example, trained classifiers may use pattern recognition techniques to identify what play or action a team is running on offense (e.g., pick-n-roll, pin-down screen, high/low set, etc.) and what defense is being utilized (e.g., man, 2-3 zone, 1-3-1 zone, matchup zone, whether screens are switched, whether players are going over or under screens, etc.). Such information can be used to report team/coach tendencies as well as provide additional metrics about individual player and team performance.

Such video analysis may also lend itself to determine a suggested five-player team composition for game situations based on metric such as defensive efficiency, offensive efficiency, rebound margin, individual player plus-minus, efficiency in guarding certain types of offensive actions/sets, etc. Moreover, the suggested five-player team compositions may vary depending on what AI models predict the opposing coach is likely to do.

Various methods disclosed herein may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, a method disclosed herein can be initiated or controlled by one or more processors, such as one or more processors included in a control system. In some implementations, a portion of one of the methods disclosed herein may be combined with a second portion of one of the methods disclosed herein and/or combined with one or more operations described herein. Additionally, one or more operations described herein may be optional and/or may be performed in a different order than shown or described. Two or more operations described herein be performed at least partially concurrently.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of determining whether a basketball shot was made or missed, the method comprising:
   receiving a frame of video that depicts a basketball hoop and a net attached to the basketball hoop;
   determining a reference frame based on the received frame;
   receiving shot attempt video;
   identifying a make area and at least one attempt area in the shot attempt video; and
   determining whether the shot attempt video depicts a make or a miss, wherein determining whether the shot attempt video depicts a make or a miss Is based on detection of entry and exit of a basketball into and out of at least one of the attempt areas of the shot attempt video without entry of the basketball into the make area of the shot attempt video, wherein determining whether the shot attempt video depicts a make or a miss is based on vertical coordinates of the basketball in the shot attempt video becoming lower than that of the make area of the shot attempt video after previously being higher than that of the make area of the shot attempt video.

2. An apparatus comprising:
   a camera configured to:
   receive a first frame of video that depicts a basketball hoop and a net attached to the basketball hoop;
   receive one or more second frames of video corresponding to a shot attempt; and a processor configured to:
   determine a reference frame based on the first frame;
   identify a make area and at least one attempt area in the one or more second frames; and determine whether the shot attempt is a make or a miss based on detection of entry and exit of a basketball into and out of at least one of the attempt areas of the shot attempt video without entry of the basketball into the make area of the shot attempt video, wherein the processor is further configured to determine whether the shot attempt is a make or a miss based on vertical coordinates of the basketball in the shot attempt video becoming lower than that of the make area of the shot attempt video after previously being higher than that of the make area of the shot attempt video.

3. A non-transitory computer-readable storage device storing instructions that, when executed, cause a processor to perform operations comprising: receiving a frame of video that depicts a basketball hoop and a net attached to the basketball hoop; determining a reference frame based on the received frame; receiving shot attempt video; identifying a make area and at least one attempt area in the shot attempt video; and determining whether the shot attempt video depicts a make or a miss,
   wherein determining whether the shot attempt video depicts a make or a miss Is based on detection of entry and exit of a basketball into and out of at least one of the attempt areas of the shot attempt video without entry of the basketball into the make area of the shot attempt video, wherein determining whether the shot attempt video depicts a make or a miss is based on vertical coordinates of the basketball in the shot attempt video becoming lower than that of the make area of the shot attempt video after previously being higher than that of the make area of the shot attempt video.

4. The method of claim 1 wherein determining whether the shot attempt video depicts a make or a miss is based on an increase in basketball-colored pixels in the make area of the shot attempt video relative to the reference frame.

5. The method of claim 1 wherein determining whether the shot attempt video depicts a make or a miss is based on basketball-colored pixels in the make area being interspersed with net-colored pixels in the make area of the shot attempt video.

6. The method of claim 1 wherein determining whether the shot attempt video depicts a make or a miss Is based on a lack of interspersion of net-colored pixels with basketball-colored pixels in the make area of the shot attempt video.

7. The apparatus of claim 2 wherein the processor is configured to determine whether the shot attempt is a make or a miss based on an increase in basketball-colored pixels in the make area of the shot attempt video relative to the reference frame.

8. The apparatus of claim 2 wherein the processor is configured to determine whether the shot attempt is a make or a miss based on basketball-colored pixels in the make area being interspersed with net-colored pixels in the make area of the shot attempt video.

9. The apparatus of claim 2 wherein the processor is configured to determine whether the shot attempt is a make or a miss based on a lack of interspersion of net-colored pixels with basketball-colored pixels in the make area of the shot attempt video.

10. The apparatus of claim 2 wherein the processor is configured to determine whether the shot attempt is a make or a miss based on a variation in a shape of the net in the make area of the shot attempt video.

11. The computer-readable storage device of claim 3 wherein determining whether the shot attempt video depicts a make or a miss is based on an increase in basketball-colored pixels in the make area of the shot attempt video relative to the reference frame.

12. The computer-readable storage device of claim 3 wherein determining whether the shot attempt video depicts a make or a miss is based on basketball-colored pixels in the make area being interspersed with net-colored pixels in the make area of the shot attempt video.

13. The computer-readable storage device of claim 3 wherein determining whether the shot attempt video depicts a make or a miss is based on a lack of interspersion of net-colored pixels with basketball-colored pixels in the make area of the shot attempt video.

14. The method of claim 1 wherein determining whether the shot attempt video depicts a make or a miss is based on a variation in a shape of the net in the make area of the shot attempt video.

15. The apparatus of claim 2 wherein the processor is configured to determine whether the shot attempt is a make or a miss based on a variation in a shape of the net in the make area of the shot attempt video.

16. The computer-readable storage device of claim 3 wherein determining whether the shot attempt video depicts a make or a miss is based on a variation in a shape of the net in the make area of the shot attempt video.

\* \* \* \* \*